United States Patent

Pyner et al.

[11] Patent Number: 6,067,039
[45] Date of Patent: May 23, 2000

[54] SYSTEMS AND METHODS FOR DETERMINING THE DISTANCE BETWEEN TWO LOCATIONS

[75] Inventors: Derek J. Pyner, North Delta; Russell A. Fretenburg, North Vancouver; Steven S. J. Kazemir, Coquitlam, all of Canada

[73] Assignee: Pacific Design Engineering (1996 ( Ltd., Burnaby, Canada

[21] Appl. No.: 09/201,592

[22] Filed: Nov. 30, 1998

[51] Int. Cl.⁷ .............................. G01S 13/08; G01B 7/14
[52] U.S. Cl. ........................ 342/125; 342/42; 342/44; 342/21; 342/127; 473/407
[58] Field of Search ............................ 342/42, 43, 44, 342/46, 47, 21, 118, 125, 126, 127, 128, 133, 135, 139, 146; 473/407

[56] References Cited

U.S. PATENT DOCUMENTS

| | | | |
|---|---|---|---|
| 3,613,095 | 10/1971 | Elwood | 342/45 |
| 3,787,846 | 1/1974 | Bishop | 343/7.3 |
| 3,797,015 | 3/1974 | Elwood | 342/45 |
| 3,816,832 | 6/1974 | Elwood | 342/45 |
| 3,839,719 | 10/1974 | Elwood | 342/45 |
| 3,868,692 | 2/1975 | Woodard et al. | 343/112 D |
| 3,916,410 | 10/1975 | Elwood | 342/45 |
| 4,136,394 | 1/1979 | Jones et al. | 364/561 |
| 4,297,701 | 10/1981 | Henriques | 343/6.5 LC |
| 4,703,444 | 10/1987 | Storms, Jr. et al. | 364/561 |
| 5,044,634 | 9/1991 | Dudley | 273/432 R |
| 5,046,839 | 9/1991 | Krangle | 356/5 |
| 5,056,106 | 10/1991 | Wang et al. | 375/1 |

(List continued on next page.)

FOREIGN PATENT DOCUMENTS

| | | | |
|---|---|---|---|
| 809118A | 11/1997 | European Pat. Off. | G01S 13/32 |
| 403118494A | 5/1991 | Japan | G01S 13/34 |
| 08166444A | 6/1996 | Japan | G01S 7/02 |
| 0827162A | 11/1996 | Japan | G01S 7/292 |
| 2249448A | 5/1992 | United Kingdom | G01S 13/34 |

OTHER PUBLICATIONS

"Information proties in fine–to–coarse image transformations", Ferraro, N.; Boccignone, G., Image Processing, 1998. ICIP 98. Proceedings. 1998 International Conference on vol.: 2, 1998, pp.: 757 –761 vol. 2.

"Automatic target recognition organized via jump–diffusion algorithms", Miller, M.I.; Grenander, U.; OSullivan, J.A.; Snyder, D.L., Image Processing, IEEE Transactions on vol.: 6 1 , Jan. 1997 , pp.: 157 –174.

"Fast subspace tracking using coarse grain and fine grain parallelism", Rabideau, D.; Steinhardt, A., Acoustics, Speech, and Signal Processing, 1995. ICASSP–95., 1995 International Conference on vol.: 5, 1995 , pp.: 3211 –3214 vol. 5.

"A simple, real–time range camera", Pentland, A.; Darrell, T.; Turk, M.; Huang, W., Computer Vision and Pattern Recognition, 1989. Proceedings CVPR '89., IEEE Computer Society Conference on, 1989, pp.: 256 –261.

*Primary Examiner*—John B. Sotomayor
*Attorney, Agent, or Firm*—Michael R. Schacht; Hughes & Schacht, P.S.

[57] ABSTRACT

A distancing system comprising radio frequency transceivers and data processing circuits. The radio frequency transceivers allow data transmission via a high frequency radio signal. The transmission and receipt of these radio signals can be timed to estimate distance. But the data processing circuits operate at local clock frequencies, and one cannot be sure at what point a give radio frequency signal was received to a resolution greater than one-half cycle of the local clock signal. The data processing circuits periodically "skip" to resynchronize with incoming data streams. These skips occur at intervals corresponding to the frequency difference between the local clock frequencies. This frequency difference can be used to pinpoint fairly precisely when a given radio frequency signal was received in a previous half-cycle of the local clock. Distances can thus be calculated based on a coarse timing value generated based on the local clock of one of the distancing units and first and second fine timing values generated based on the skips at one or both of the distancing units.

22 Claims, 14 Drawing Sheets

U.S. PATENT DOCUMENTS

| | | | |
|---|---|---|---|
| 5,095,430 | 3/1992 | Bonito et al. | 364/410 |
| 5,298,904 | 3/1994 | Olich | 342/42 |
| 5,311,271 | 5/1994 | Hurt et al. | 356/5 |
| 5,582,566 | 12/1996 | Imasaka et al. | 473/407 |
| 5,652,534 | 7/1997 | Taylor et al. | 327/23 |
| 5,912,644 | 6/1999 | Wang | 342/457 |

FIG. 3
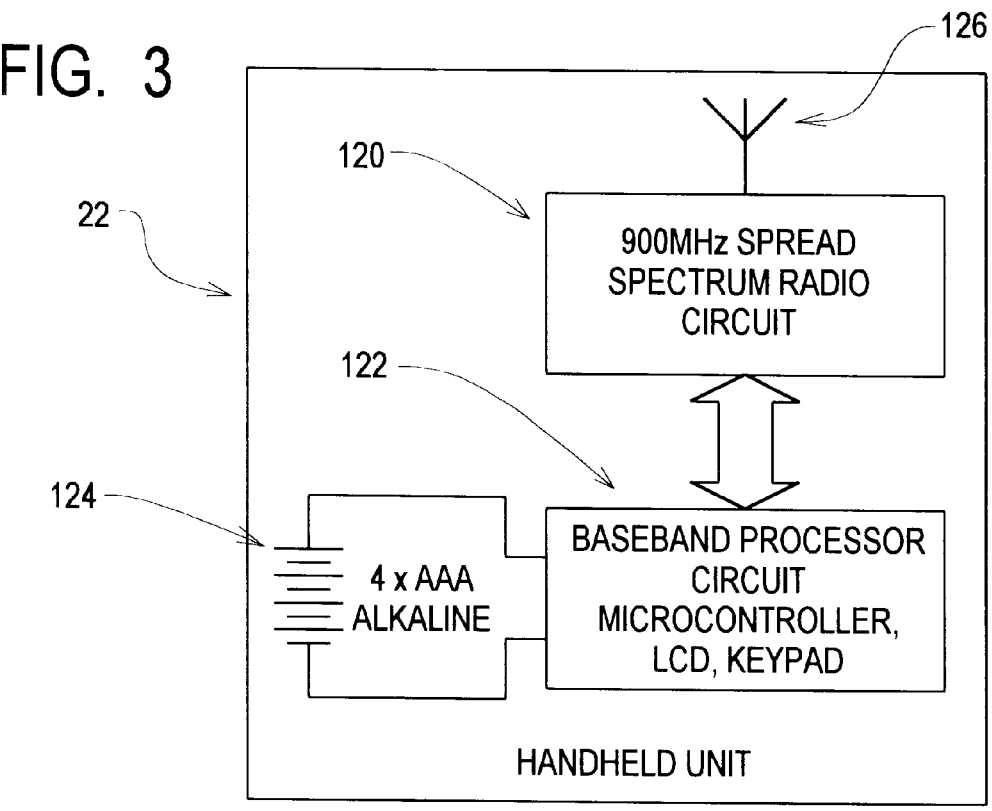
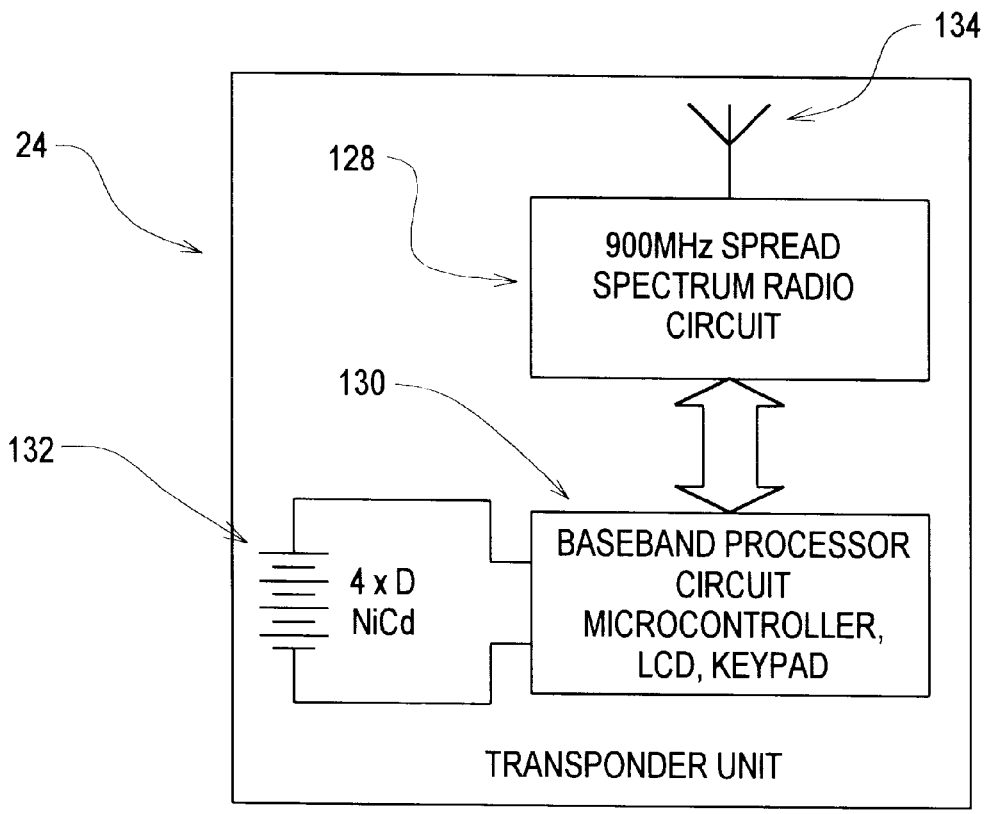

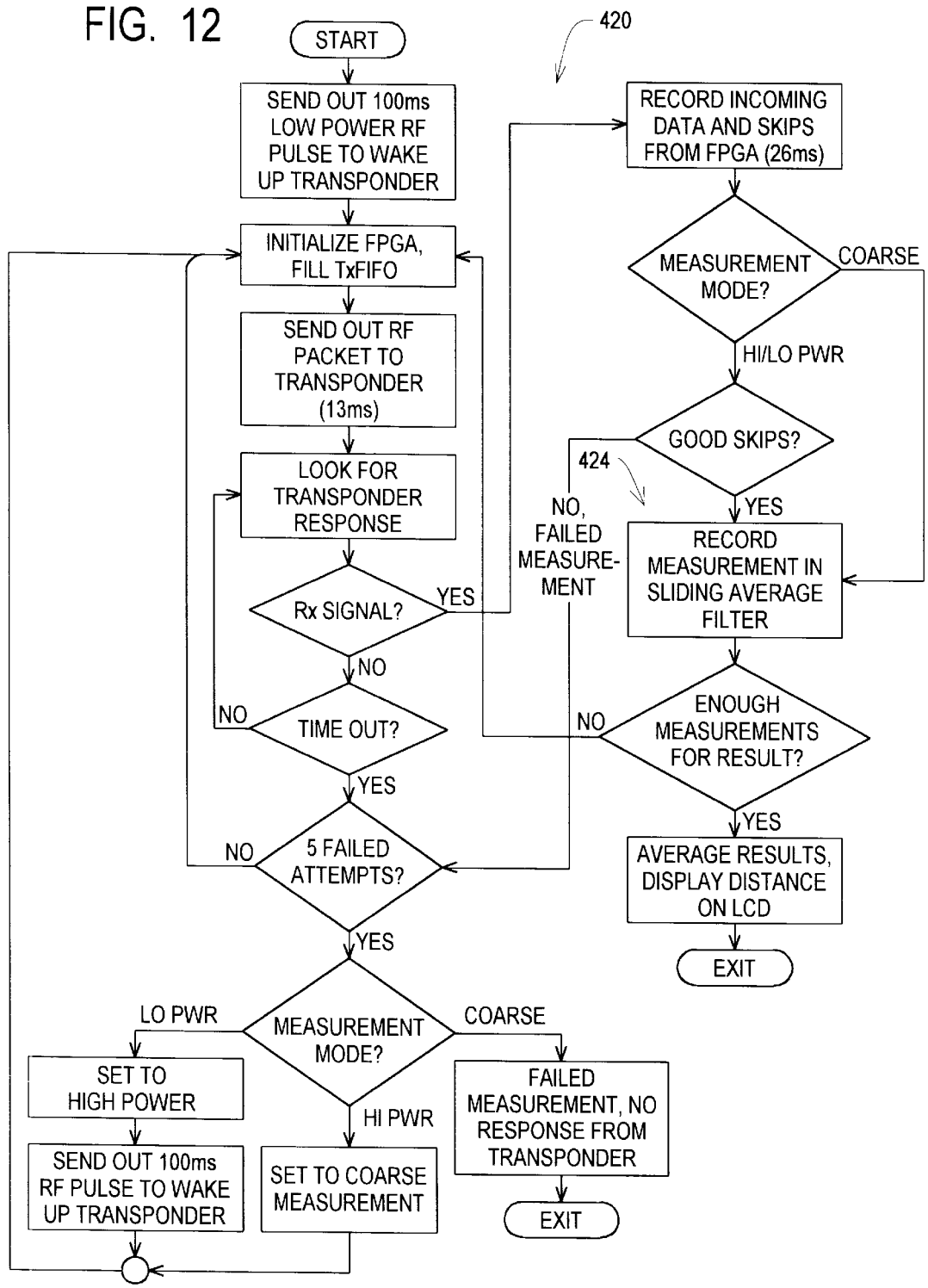

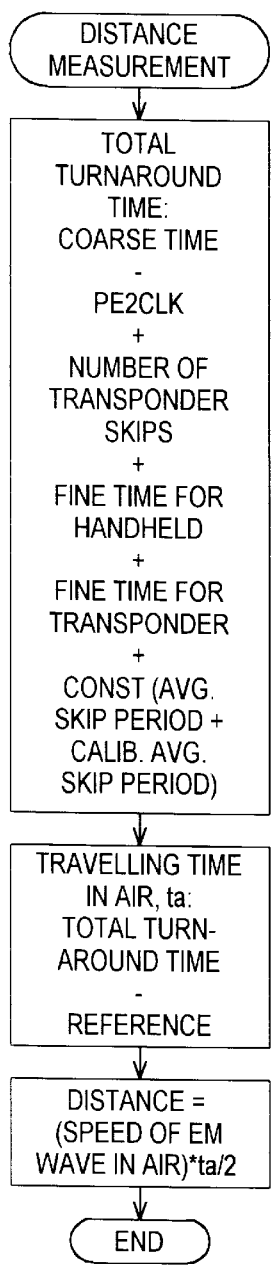
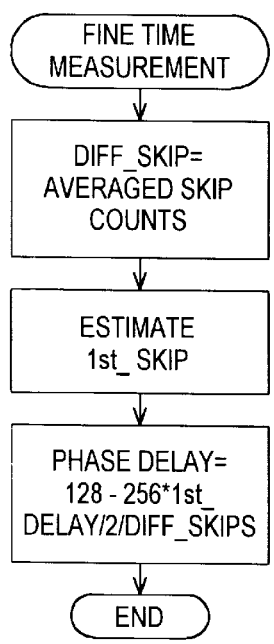
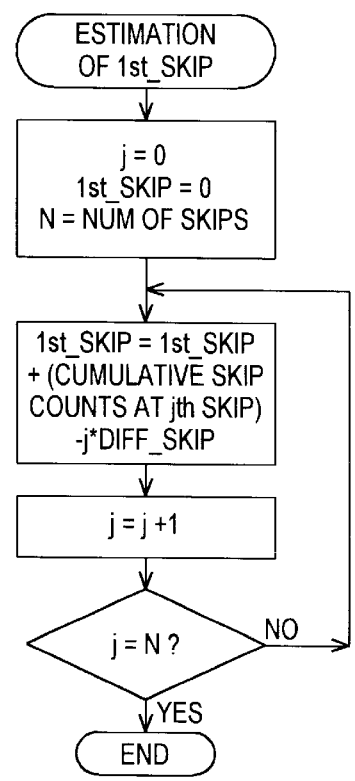
DISTANCE MEASUREMENT MATH ROUTINE

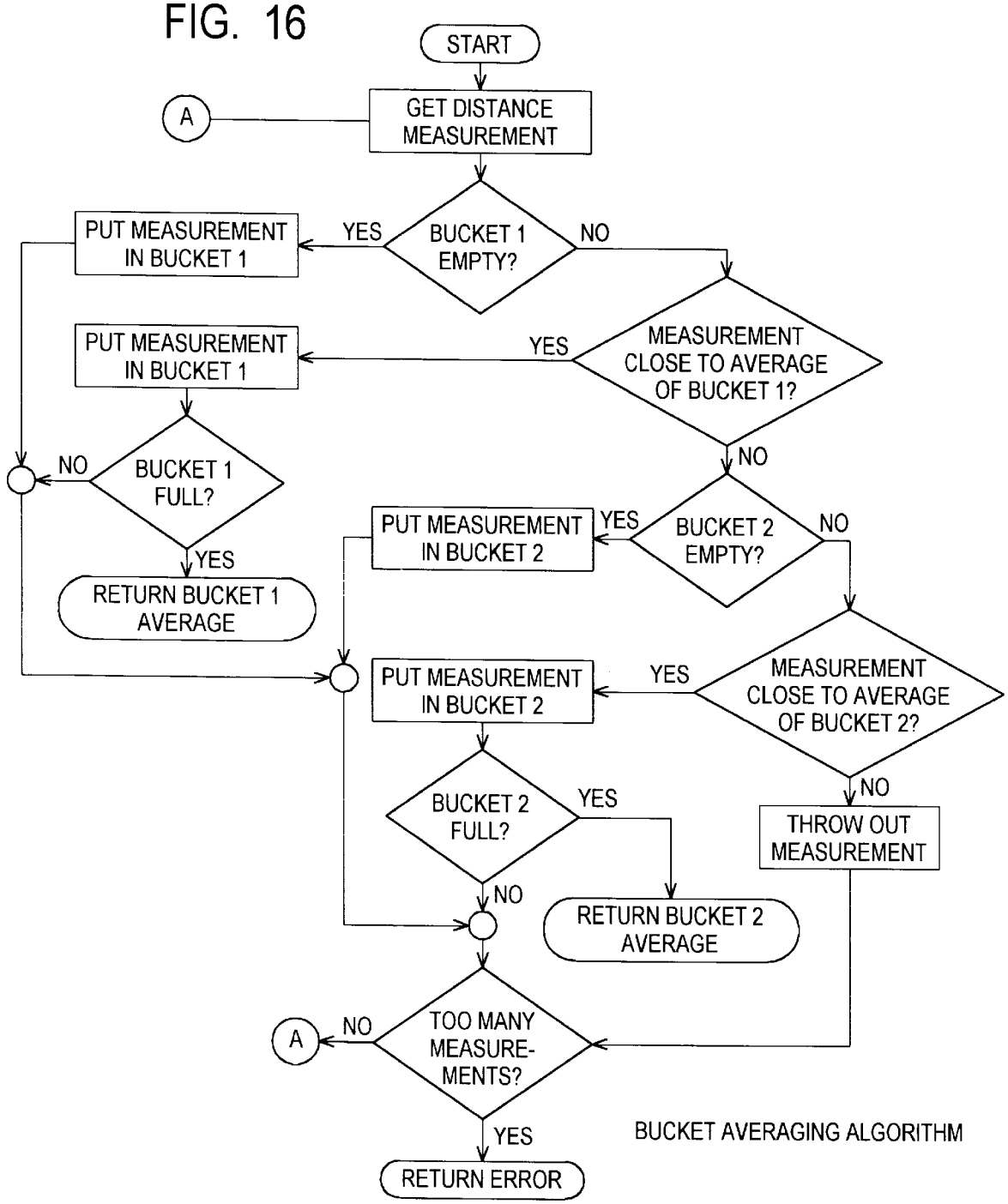

FIG. 17A
FIG. 17B
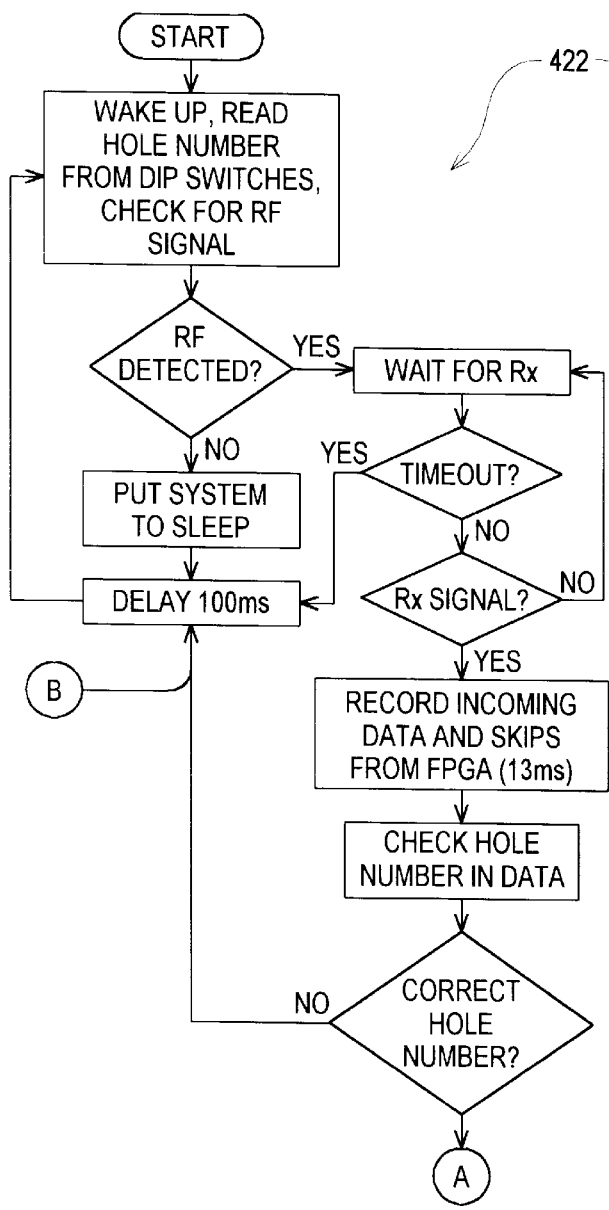
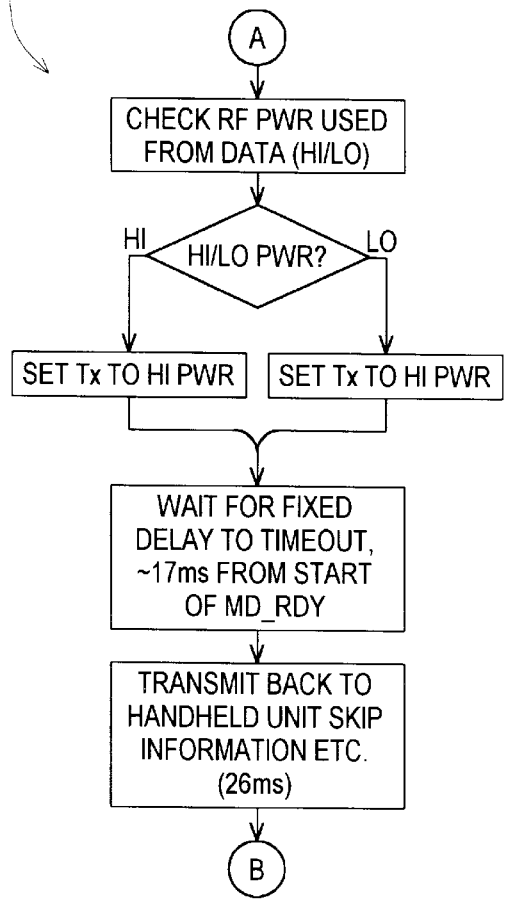

SYSTEMS AND METHODS FOR DETERMINING THE DISTANCE BETWEEN TWO LOCATIONS

TECHNICAL FIELD

The present invention relates to systems and methods for determining the distance between two locations and, more specifically, to such systems and methods that determine distance based on the time a radio signal takes to propagate from a first location to a second location.

BACKGROUND OF THE INVENTION

In many situations, knowledge of the distance between two locations is important. A number of systems and methods have been developed to determine distance without taking physical measurements.

The present invention relates to distancing systems and methods that determine distance based on the propagation speed of a radio signal. In particular, for the purposes of the present invention the propagation speed of a radio signal can generally be considered a constant. Accordingly, by determining the amount of time that a signal takes to propagate from the first location to the second location, a value corresponding to the distance between the first and second locations can be calculated.

Situations in which the distance between two locations can be important include industrial settings, construction settings, object or individual tracking, and sport settings. The present invention is of particular significance when used to determine the distance between a golfer and a flag pin on a golf course, and that application will be described herein in detail. But it should be clear that the concepts of the present invention can be applied to other environments such those as described above. Accordingly, the scope of the present invention should be determined by the claims appended hereto and not the following detailed description.

RELATED ART

A Harris Semiconductor TechBrief dated 1996 discloses a system and method of measuring distance between first and second locations by using a direct sequence spread spectrum signal and a the Prism chip set including the HSP3824. The method described in this document suggests using Transmit Enable and Receive Data Ready signal lines of the baseband processor that indicate when transmission of a data packet begins and when a data packet is received. The Transmit Enable and Receive Data Ready signals are generated when the baseband processor transmits data to and receives data from a radio frequency (RF) circuit that transmits and receives RF signals. The Transmit Enable and Receive Data Ready signals thus generally correspond to the transmission and receipt of RF signals that propagate between the first and second locations.

The resolution of the system described in the Harris TechBrief publication is limited because the Transmit Enable and Receive Data Ready signals are gated by a local baseband clock signal. More specifically, the Transmit Enable signal is an asynchronous input to the baseband processor. In addition, the incoming radio RF packet is also asynchronous, so the Receive Data Ready signal is also generated based on an asynchronous input to the baseband processor. These signals are gated on one edge of the baseband clock signal, but could have actually been generated or received at any point in the prior half-cycle of the baseband clock signal. Accordingly, ambiguity exists as to exactly when the RF signals are actually transmitted and received.

In total, these ambiguities create an uncertainty of approximately one-half cycle of the master clock when the signal was transmitted and approximately one half of the master clock cycle as to when the signal was received. Therefore, by timing these signals, the best measurement resolution is limited by the sum of these two uncertainties, which gives a maximum uncertainty of one master clock cycle. This is the equivalent of approximately 45 feet when using a 22 MHz reference clock.

A portion of this timing uncertainty can be eliminated or reduced by synchronizing the Transmit Enable signal with the master clock signal. This removes the initial one-half master clock ambiguity, resulting in the only uncertainty being that introduced by the Receive Data Ready signal. This translates into an error margin of approximately plus or minus eleven feet, or a resolution of approximately 22 feet.

An alternative to synchronizing the Transmit Enable signal with the master clock is to use the Transmit Ready Output signal from the baseband processor. This Transmit Ready Output signal is synchronized with the master clock and rises just as the data portion of the packet is about to be transmitted. This is similar to the creation of the Receive Data Ready signal, which rises just as the data portion of the receive signal is about to be received. If timing measurements make use of the Transmit Ready Output signal from the baseband processor, no ambiguity exists on the transmitting side. Therefore, the only uncertainty is introduced by the receiver, which again reduces the error margin to approximately plus or minus eleven feet (22 feet).

The techniques described in the Harris TechBrief are thus appropriate for situations in which a margin of error of 22 feet is acceptable. The TechBrief generally teaches that additional processing may be attempted to improve resolution, but does not disclose, teach, or suggest how this additional processing might be implemented.

The baseband processor chip set described in the Harris TechBrief is designed to work with an RF transmitter/receiver employing direct sequence spread spectrum technology. This technology is widely used in wireless communications systems and will not be described herein in detail. Enclosed herewith as background is a World Wide Web page entitled "Basics of a Direct Sequence Spread Spectrum System for Wireless Communications".

The following patents were uncovered as part of a professional patentability search conducted on behalf of the Applicants: U.S. Pat No. 5,582,566 to Imasaka et al.; U.S. Pat. No. 5,311,271 to Hurt et al.; U.S. Pat. No. 5,298,904 to Olich; U.S. Pat. No. 5,095,430 to Bonito et al.; U.S. Pat. No. 5,056,106 to Wang et al.; U.S. Pat. No. 5,046,839 to Krangle; U.S. Pat. No. 5,044,634 to Dudley; U.S. Pat. No. 4,703,444 to Storms, Jr., et al.; U.S. Pat. No. 4,297,701 to Henriques; U.S. Pat. No. 4,136,394 to Jones et al.; U.S. Pat. No. 3,868,692 to Woodard et al.; and U.S. Pat. No. 3,787,846 to Bishop.

All of these patents relate to systems and methods for determining distances using radio signals, and most of these relate to golfing applications. None of these patents discloses, teaches, or suggests a system that uses signal propagation times of direct sequence spread spectrum signals to determine distance. The Applicant further believes that none of these references disclose, teach, or suggest systems or methods that resolves the ambiguities and uncertainties introduced by the asynchronous nature of the transmission and receipt of RF signals relative to the local processor system clocks. None of these systems teach how to time RF signals to an accuracy of 1 yd (~3 ns).

OBJECTS OF THE INVENTION

From the foregoing, it should be clear that a primary object of the present invention is to provide improved systems and methods for determining distances and, in particular, improved methods for allowing a golfer to determine proximity to a pin on a golf course.

Another more specific object of the present invention is to provide distancing systems and methods having a favorable combination of the following characteristics:

- allows the user to determine a distance to a predetermined location with a resolution on the order of plus or minus one yard;
- employs existing, conventional RF radio technology and chip sets designed to be used therewith;
- can be manufactured and packaged in a small, portable configuration;
- can be manufactured and packaged relatively inexpensively; and
- conforms to existing and proposed United States communications regulations and similar regulations in countries outside of the United States.

SUMMARY OF THE INVENTION

These and other objects are obtained by the present invention, which comprises a handheld unit carried by the user and a transponder unit mounted at a distant location such as a golf pin. The handheld unit and transponder unit each comprise identical RF radio circuits configured to send and receive RF radio signals. The handheld unit and transponder unit each further comprise a data processing circuit.

The exemplary system described herein uses RF radio circuits configured to transmit and receive 900 MHz direct sequence spread spectrum signals. The use of 902–928MHz ism band is allowed in many of the jurisdictions in which the present invention is designed to operate. In addition, 900 MHz direct sequence spread spectrum signals carry data, and the technology used to transmit, receive, and process these signals is conventional and currently available in the marketplace. The basic systems and methods described herein may, however, be implemented with other types of RF communications systems.

The handheld unit data processing circuit performs timing functions and calculates distances. The transponder unit data processing circuit performs part of the timing functions used to calculate distances.

The handheld unit generates a coarse measurement of distance based on the time of travel of a RF signals from the handheld unit to the transponder unit and back, including any delay introduced by the transponder unit. The coarse measurement is fairly low resolution (~+/− 8 yards).

The data processing circuit of the handheld and transponder units perform additional fine measurement processing to increase resolution. In particular, the fine measurement processing relies on the fact that certain clocks within the handheld unit and transponder unit do not operate at exactly the same frequency. This small difference in clock frequencies requires the Baseband processor in the receiving unit to resynchronize to the incoming data stream by adjusting ahead or back one-half of the clock cycle when the incoming data stream falls behind or gets ahead of, respectively, the local clock by more than ¼ of a clock cycle.

In the present application, each adjustment made by the data processing circuits to resynchronize with the incoming data stream is referred to as a "skip". These skips occur at an average skip rate determined by the difference between the transmit and receive local clock frequencies. The average skip rate will be twice this frequency difference. The calculation is further complicated in that the skips will only occur at specific points in the incoming packet. A skip can only occur every 128 data bits, (4096 clock cycles, 204.8 $\mu$s) which forces the use of an averaging scheme on the skip positions.

Based on the average time between skips, the frequency difference between the clocks can be calculated. In addition, the skip positions relative to the incoming data packet allows us to calculate the phase between the two clocks. Given the difference in frequencies and the phase shift between the clocks, the exact time of reception can be determined with greater accuracy. In particular, because the local clock frequency at the receiving unit and the frequency difference are both known, the receiving unit can calculate the frequency of the sending unit. This information yields fine time measurement value that can be used to adjust the coarse measurement time value to obtain a refined measurement time value with much higher resolution and accuracy.

The present invention thus allows distance to be determined between objects at two locations with a resolution that is acceptable for a large number of environments.

The present invention may also utilize a collision scheme, depending on the environment in which it will be used. In the context of a golf course, system utilization will be relatively low and a collision scheme may not be necessary. In other environments, collision situations can be detected by listening before transmitting. If another transmitter is transmitting, another attempt is made after a random time period. The random time period allows two systems that have detected a potential collision to try and retransmit without interfering with each other.

Accuracy of measurements can be increased by providing a calibration unit. In the context of a golf course, the calibration unit would be located, for example, at a location such as the club house or adjacent putting green. Calibration is accomplished simply by placing the handheld unit a known distance from a calibration unit and taking a measurement. This sets a reference distance, and the timing measurements may be adjusted as necessary to compensate for any system delays caused by temperature, humidity, and/or age of the various components.

Both the handheld unit and the transponder unit employ batteries as a power source. The transponder uses 4 rechargeable D batteries, and the Handheld units use 4 AAA's. The transponder unit is particularly susceptible to battery drain because it must be active more often to listen for signals generated by all handheld units in the area. Both the transponder unit and the handheld unit use power management schemes to optimize power consumption. In particular, the transponder unit is normally asleep and wakes up periodically to detect spread spectrum signals of interest. The Handheld unit will wake up and take a measurement when the button is pressed, and then automatically go to sleep after ~10 seconds.

In addition, the handheld unit and transponder unit both are designed to transmit in either a low power mode or a high power mode depending upon whether logical data can be extracted from the received signals. Using low power when possible helps reduce unnecessary interference to other transponders and handheld units in the area.

BRIEF DESCRIPTION OF THE DRAWINGS

FIG. 3 is a high level block diagram depicting the overall structure of the handheld unit and transponder unit of the present invention;

FIG. 12 is a flow chart depicting the logic steps implemented in the handheld unit; and FIG. 13 is a flow diagram depicting the distance measurement calculations performed in the handheld unit;

FIG. 14 is a flow diagram depicting the fine time measurement performed by the handheld and transponder units;

FIG. 15 is a flow diagram depicting the estimation of the first skip performed by the handheld and transponder units;

FIG. 16 is a flow diagram depicting the bucket averaging algorithm performed at the handheld unit; and FIGS. 17a and 17b depict the logic implemented at the transponder unit.

DETAILED DESCRIPTION OF THE INVENTION

Figure 1:
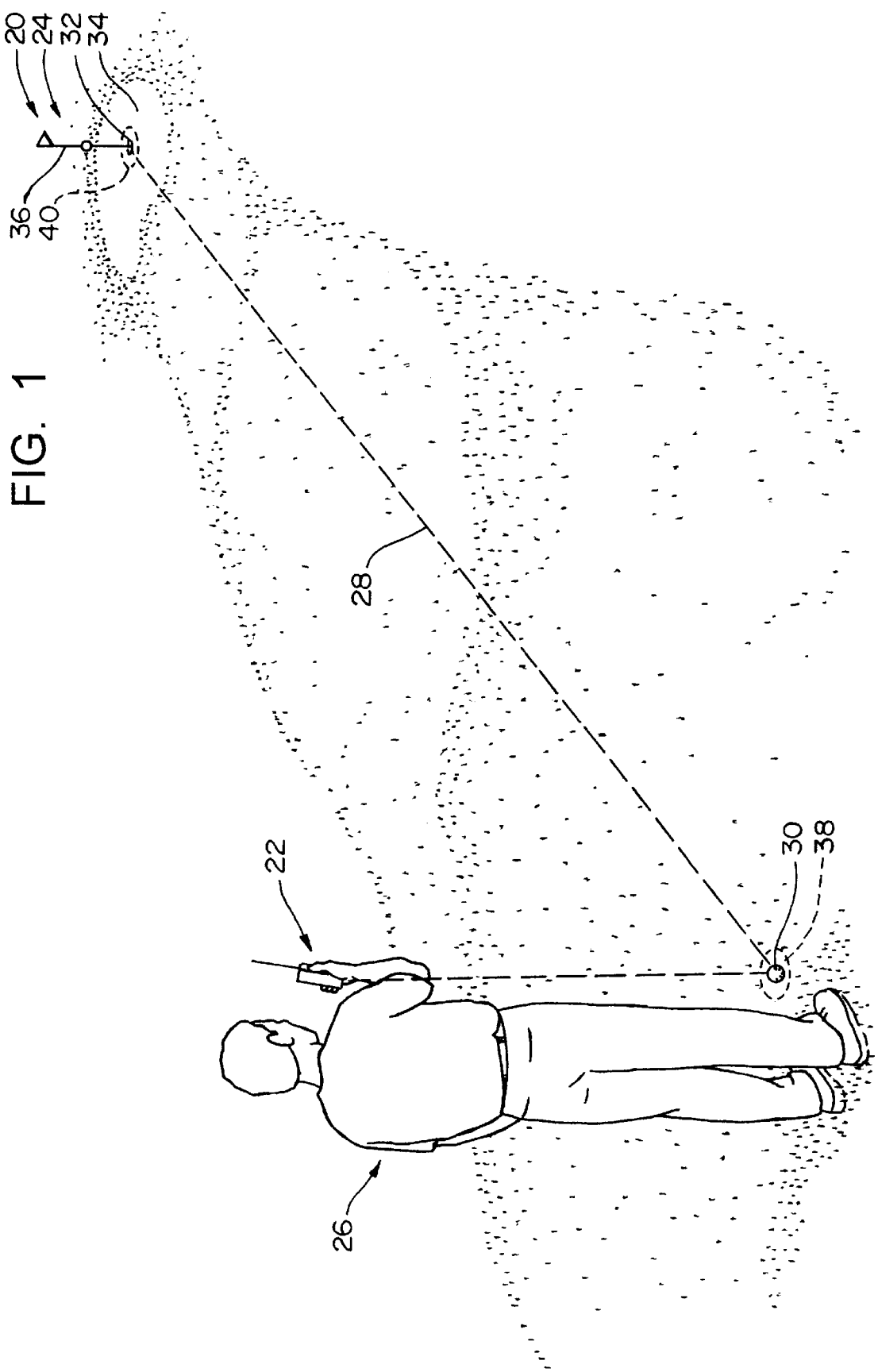
FIG. 1 is an environmental view depicting one typical environment in which a distance locating system of the present invention may be used.

Referring initially to FIG. I of the drawing, depicted therein as 20 is a distancing system constructed in accordance with, and embodying, the principles of the present invention. This system 20 comprises a handheld unit 22 and a transponder unit 24.

The system 20 is shown in FIG. 1 being used by a golfer 26 to determine a distance D (indicated by broken line 28) between a golf ball 30 and a golf hole 32. The golf hole 32 is located on a golf green 34 and is marked by a flag pin 36.

But as described above, the system 20 may be used in other environments in which distance information is important. More generally, the individual 26 is using the distancing system 20 to determine the distance between a first location 38 (at which the golf ball 30 is located) and a second location 40 (at which the hole 32 is located).

In particular, the handheld unit 22 is held along a vertical line 42 such that the unit 22 is directly above the first location 38. The transponder unit 24 is mounted on the flag pin 36; because the flag pin 36 extends vertically above the hole 32, the transponder unit 24 is located above the second location 40. The true, straight line distance formed by a straight line between the handheld unit 22 and the transponder unit 24 will thus correspond to the distance D indicated by the broken line 28 in FIG. 1.

Figure 2:
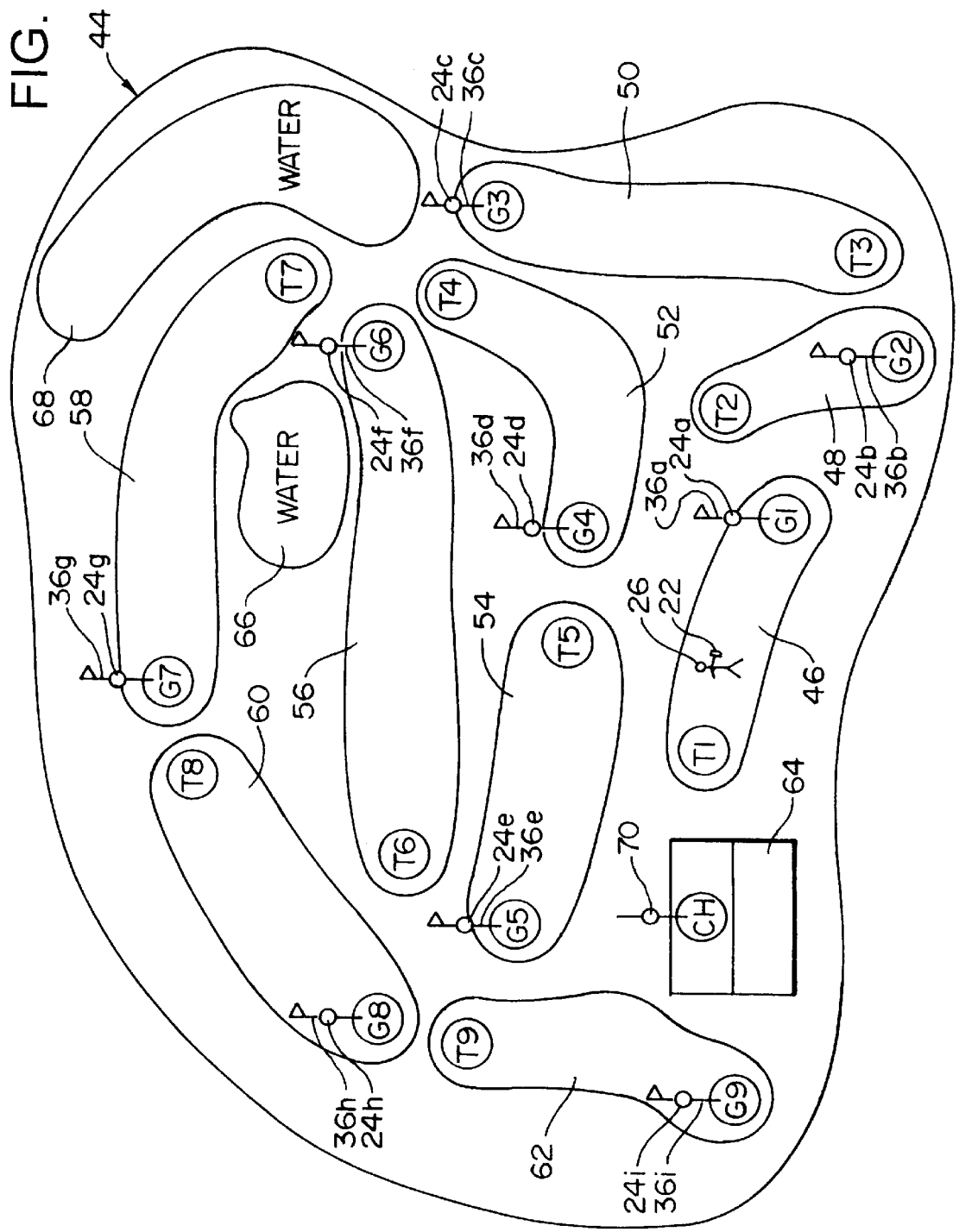
FIG. 2 is a top plan view of a golf course showing the locations of pin transponder units of the present invention.

Referring now to FIG. 2, depicted therein is a golf course 44 comprising a plurality of fairways 52–62, a club house 64, and first and second water hazards 66 and 68. The exemplary course 44 depicted in FIG. 2 is, for purposes of clarity, a nine hole course. In many instances, 18 or more holes are conventionally provided in one course, but the exemplary course 44 adequately illustrates the principles of the present invention.

As is conventional, the fairways 46–62 each comprise a tee area and a green area. In FIG. 2, the tee areas are indicated by a circle and a two part reference number starting with a T. Similarly, the green areas are indicated by a two part reference number beginning with a "G". The second part of these reference numbers corresponds to the hole number on which the green or tee is located. Thus, the reference number G5 refers to the green area of the fifth hole 60, while the reference number T7 refers to the tee of the area of the seventh hole 64. A course with more holes may use reference numbers such as G14 and T15. Golfers follow a path that extends from the first hole 46 to the ninth hole 62 in order, with the green area of each hole being located relatively close to the tee area of the next hole.

FIG. 2 further illustrates that a plurality of flag pins 36 are distributed throughout the golf course 44. In particular, 1 st through 9th flag pins 36a–i are provided, one each on the green area of each of the 1 st through 9th fairways 46–62. A transponder unit is mounted on each flag pin, so transponder units 24a–l are identified in FIG. 2. With many golf courses, the greens of adjacent fairway can be located quite close to each other. For example, as shown in FIG. 2, the green areas G1–G2–G4, G3–G6, and G5–G8 of the golf course 44 are all physically located relatively close to each other.

In addition to multiple transponder units 24, a normal golf course 44 will have as many as two or more groups of golfers may be playing a given hole at one time. Each group can contain as many as four golfers. It is thus probable that at any given point in time, many handheld units 22 will be in use.

Accordingly, the distancing system 20 is designed for environments, such as golf courses, in which multiple handheld units and multiple transponder units are likely to be operating at any given time. Thus, the distancing system 20 is capable of determining distance between any given handheld unit 22 and transponder unit 24 as selected by the operator.

The distancing system 20 described above operates basically as follows. The handheld unit 22 is activated by the user 26 when the user 26 desires to determine the distance D. The transponder unit 24 is normally in a sleep mode but is configured to wake up periodically to detect any signals that may be generated by the handheld unit 22 or other similar handheld units in the vicinity. When such a signal is detected, the transponder unit 24 will wake.

The handheld unit will first generate a "wake-up" signal to the transponder. This signal contains no useful data, but serves to wake up the transponder. With the transponder unit 24 awake, the handheld unit 22 will generate a handheld signal that will propagate from the handheld unit 22 to the transponder unit 24. In response, the transponder unit 24 generates a transponder signal that propagates back to the handheld unit 22 from the transponder unit 24. The handheld and transponder signals contain data packets and start out as a digital data stream that is subsequently modulated for transmission as a radio frequency signal, demodulated, processed, modulated again, demodulated again, and then subsequently processed. In this context, the handheld signal is transmitted at one point in time and the transponder signal is received at the handheld unit 22 at a second point in time sometime later.

Ideally, the distance D could be calculated simply by a timer at the handheld unit 22 that starts when the handheld unit 22 generates the handheld signal and stops when the handheld unit 22 receives the transponder signal. The value determined by this timer could then be multiplied by the propagation speed of the signals (taking into account any delay introduced by the electronics) and divided by two to obtain the distance D.

Unfortunately, a number of practical considerations complicate the process of determining the distance D. First, as described in detail above, the clock frequencies employed by conventional chip sets for generating direct sequence spread spectrum signals are such that an unacceptable level of uncertainty is introduced into the calculations. Second, such environmental factors as the age of the electrical components of the system 20, temperature, humidity, and the like can increase uncertainty.

The distancing system 20 of the present invention thus employs several methods to increase accuracy, reliability, and resolution. First, the system 20 employs a multi-step time measurement process to determine the distance D; the time measurement process of the present invention is substantially more complex than the simple timer of the ideal case. Second, the distancing system 20 employs a calibration system that determines a known reference point for the distance calculations that will take into account environmental factors that might affect the time measurement process.

Referring initially to the time measurement process, the distancing system 20 first generates a coarse measurement value using the simple timing process as described above. The system 20 additionally generates two fine measurement values (one for the handheld unit, one for the transponder unit) based on the frequency and phase differences of the clocks within the handheld unit and the transponder unit. These fine measurement values are added to the coarse measurement value to obtain a refined time measurement value corresponding to signal propagation time.

The refined measurement value is then validated using a validation process based on a set of predetermined criteria. A number of such valid, refined measurement values are then averaged to obtain an averaged measurement value. The averaged measurement is then adjusted to obtain a final measurement using a correction value calculated using the calibration process as described below. The accuracy, reliability, and resolution of the final measurement is acceptable for most industrial, construction, person or object tracking, and sports environments.

As shown in FIG. 2, the calibration process involves providing a calibration unit 70 that allows a given handheld unit to generate a correction value that takes into account environmental factors such as age of the components, humidity, and temperature. The calibration unit 70 can be located at the club house 64 of the golf course 44 or any other convenient position, probably near the start of the golf course. Electrically, the calibration unit 70 is in all respects the same as the transponder units 24 described above but is conveniently located so that the handheld units can be calibrated when the golfer arrives at the course or, in the case of rental units, calibrated daily as necessary by golf course staff.

More specifically, each handheld unit 22 is placed a known calibration distance away from the calibration transponder unit 70 and operated to obtain a final measurement. The correction value is calculated based on the final measurement and the calibration distance and used as generally described above.

The details of construction and operation of the distancing system 20 will now be described in further detail. In the following description, the terms "local" and "remote" will refer to describe attributes of a given distancing unit. For example, a "local clock" will refer to a clock signal at a given distancing unit. But that given distancing unit may contain a number of clock signals. The terms "local" and "remote" thus refer to the location of a given attribute and not to a specific attribute at a given distancing unit.

Referring to FIG. 3, depicted therein is a block diagram showing the handheld unit 22 and transponder unit 24. The handheld unit 22 comprises a spread spectrum radio circuit 120, a data processing circuit 122, a power supply 124 comprising four AAA alkaline batteries, and an antenna 126. The transponder unit 24 comprises a spread spectrum radio circuit 128, a data processing circuit 130, a power supply 132 comprising four "D" size batteries, and an antenna 134.

The spread spectrum radio circuits 120 and 128 are transceivers and thus transmit and receive spread spectrum radio signals through the antennas 126 and 134, respectively. The data processing circuits 122 and 130 group data into packets and control the spread spectrum radio circuits 120 and 128 to transmit and receive these data packets. The power supplies 124 and 132 supply electrical power to the circuits 120, 122, 128, and 130.

The data processing circuits 122 and 130 further perform the timing functions necessary to determine the propagation times of the handheld and transponder signals and calculate the distance based thereon. The data processing circuit 122 of the handheld unit 22 calculates the final measurement and displays distance to the user.

Figure 4:
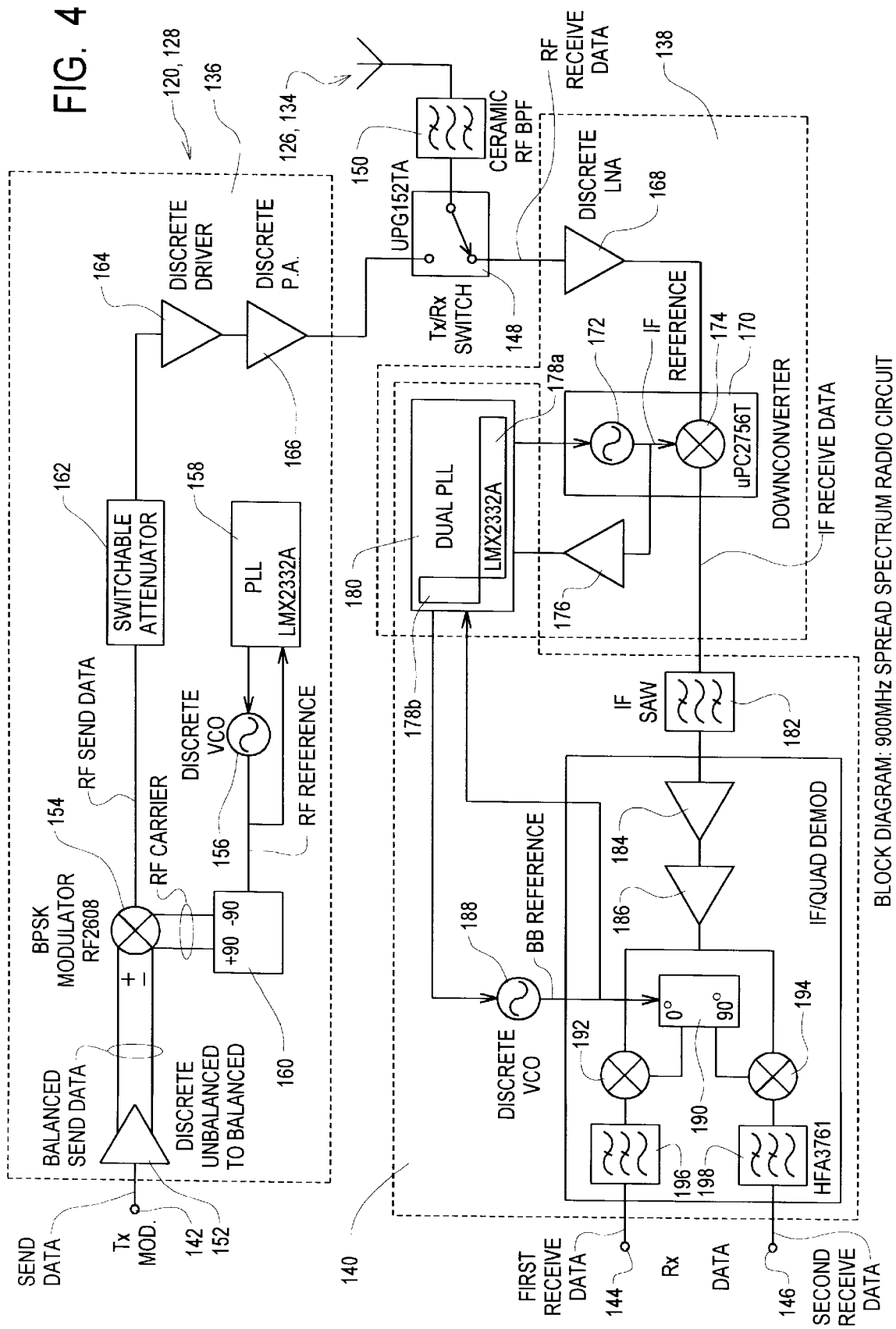
FIG. 4 is a block diagram of the spread spectrum radio circuit employed by the handheld unit and transponder unit depicted in FIG. 3.

Referring now to FIG. 4, depicted therein in detail is a block diagram of the spread spectrum radio circuits 120 and 128 of the handheld unit 22 and transponder unit 24. The circuits 120 and 128 are identical and will both be described with reference to FIG. 4. These circuits 120 and 128 are generally conventional and will be discussed below only to the extent necessary for a complete understanding of the present invention.

The circuit 120,128 basically comprises a transmit portion 136, a receive portion 138, and an intermediate frequency (IF) portion 140. A modulated binary Send Data signal is present at an input terminal 142. First and Second Receive Data binary signals are present at first and second output terminals 144 and 146, respectively. A transmit/receive switch 148 is configured to operate either in a transmit mode in which the transmit portion 136 is connected to the antenna 126,134 through a bandpass filter 150 or in a receive mode in which the receive portion 138 is connected through the filter 150 to the antenna 126,134.

When the circuit 120,128 is in the transmit mode, the Send Data signal to be transmitted is applied to the input terminal 142. The Send Data signal at the input terminal 142 is unbalanced and is passed through an amplifier 152 to obtain a Balanced Send Data signal. The Balanced Send Data signal is applied to data inputs of a modulator 154. A voltage controlled oscillator 156 generates an RF Reference signal under control of a phase lock loop circuit 158. The RF Reference signal is applied to a phase splitter 160 to obtain an RF Carrier signal. The RF Carrier signal is applied to carrier inputs of the modulator 154.

The modulator 154 functions as a two channel mixer that generates a spread spectrum RF Send Data signal based on the Balanced Send Data signal and the RF Carrier signal. The RF Send Data signal is then passed through a switchable attenuator 162, driver amplifier 164, and power amplifier 166. The amplified RF Send Data signal then passes through the switch 148 and the bandpass filter 150 and is transmitted from the antenna 126,134.

When the circuit 120,128 is in the receive mode, a spread spectrum RF Receive Data signal received by the antenna 126,134 is passed through the bandpass filter 150 and the switch 148 to the receive portion 138.

The receive portion 138 comprises a low noise amplifier 168, down converter section 170 comprising a voltage controlled oscillator 172 and a mixer 174, a feedback amplifier 176, and a phase lock loop circuit 178a. The exemplary phase lock loop circuit 178a is packaged in an integrated circuit chip 180 along with a second phase lock loop circuit 178b that forms a part of the IF section 140 as will be described in further detail below.

The RF Receive Data signal input to the receive portion 138 is first amplified by the low noise amplifier 168. The oscillator 156, feedback amplifier 160, and phase lock loop circuit 162a generate a stable, accurate IF Reference signal. The mixer 174 generates an IF Receive Data signal based on the amplified RF Receive Data signal and the IF Reference signal.

In addition to the phase lock loop circuit 178b described above, the IF section 140 comprises a SAW filter 182, gain blocking amplifiers 184 and 186, a voltage controlled oscillator 188, a phase splitter 190, first and second baseband mixers 192 and 194, and first and second output filters 196 and 198.

The phase lock loop circuit 178b and oscillator 188 generate a stable baseband Reference signal. The phase splitter 190 generates baseband Demodulation signals based on the baseband Reference Signal. The IF Receive Data signal is passed through the SAW filter 182 and the amplifiers 184 and 186. The baseband mixers 192 and 194 mix the filtered, amplified IF Receive Data signal with the baseband Demodulation signals. The outputs of the mixers 192 and 194 are passed through the filters 196 and 198 to obtain the First and Second Receive Data signals.

The First and Second Receive Data signals are binary signals, but must be further processed by the data processing circuits 122 and 130 as will be described below.

Figure 5:
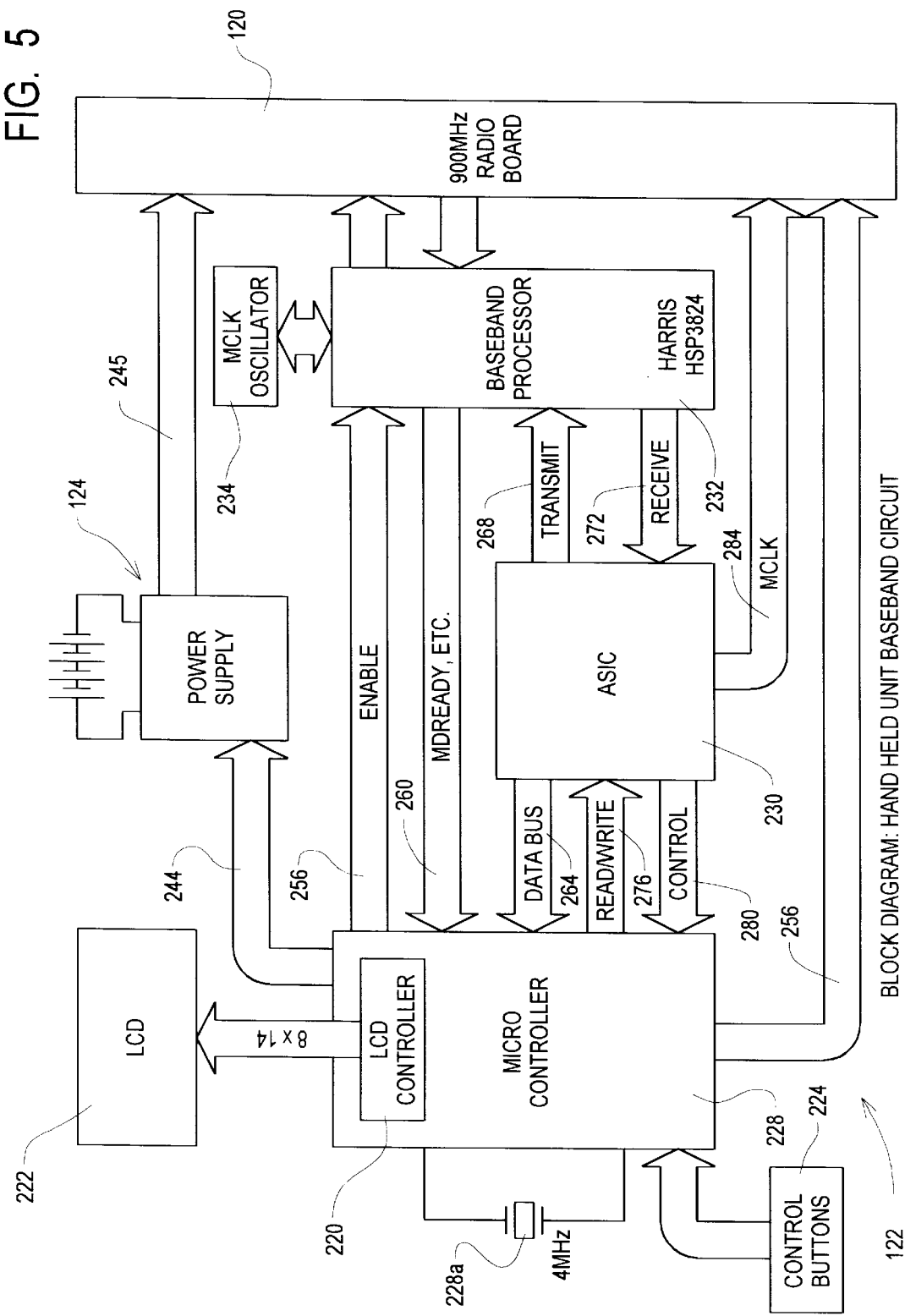
FIG. 5 is a block diagram of the data processing circuit of the handheld unit of FIG. 3.
Figure 6:
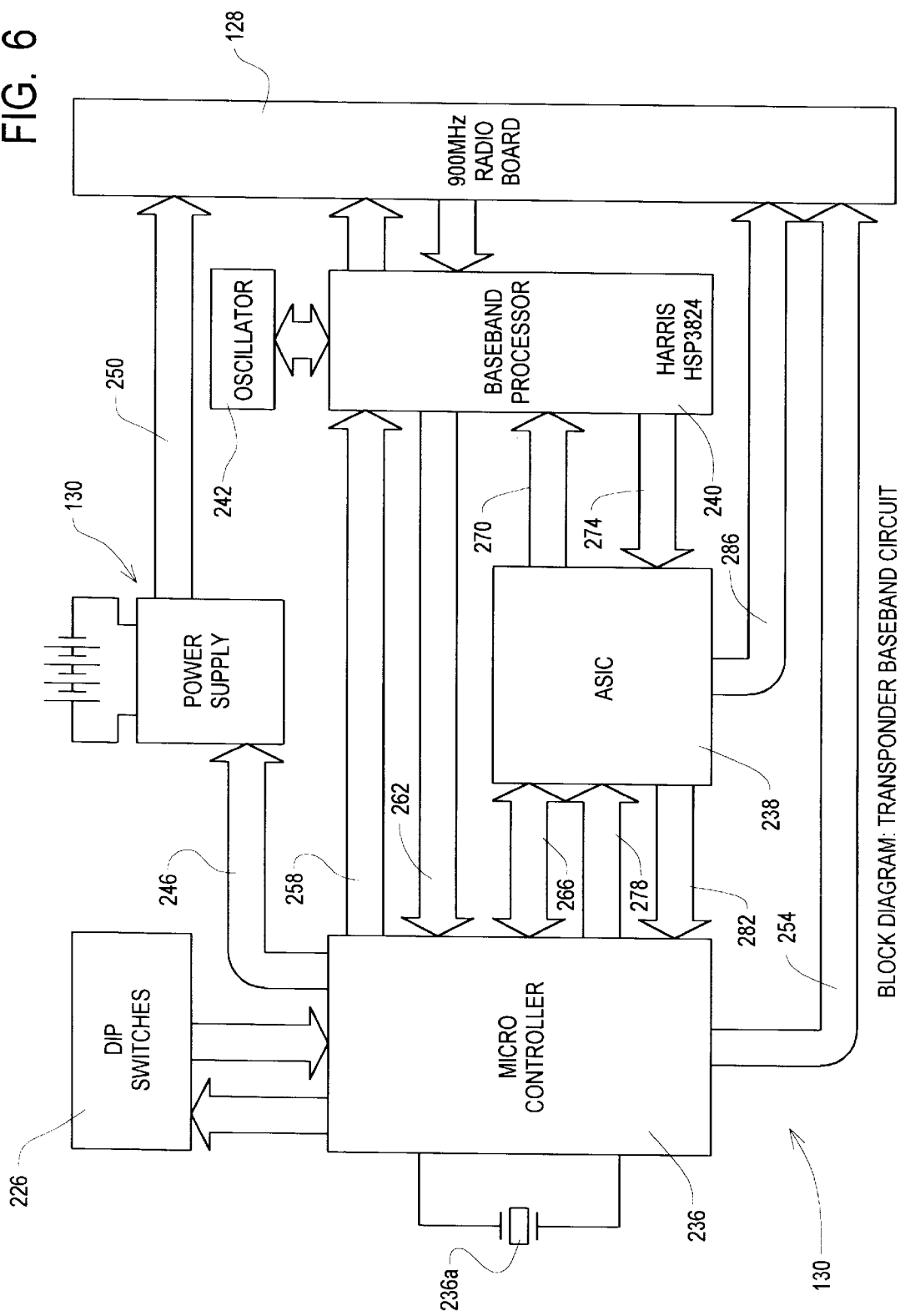
FIG. 6 is a block diagram of the data processing circuit of the transponder unit depicted in FIG. 3.

Referring now to FIGS. 5 and 6, depicted therein are the details of the data processing circuits 122 and 130. These circuits 122 and 130 differ primarily in that the data processing circuit 122 of the handheld unit 22 comprises an LCD controller 220, LCD 222, and control buttons 224. In contrast, the data processing circuit 130 of the transponder unit 24 comprises a set 226 of dip switches. In all other respects, the components of the data processing circuit 122 are the same as those of the data processing circuit 130. But, as will be described in detail below, certain of these components are configured to operate differently depending upon whether they are used in the handheld unit 22 or the transponder unit 24.

The handheld data processing circuit 122 comprises a microcontroller 228, an application specific integrated (ASIC) circuit 230, a baseband processor 232, and an oscillator 234. The transponder data processing circuit 130 comprises a microcontroller 236, an ASIC 238, a baseband processor 240, and an oscillator 242.

The microcontrollers 228 and 236 are general computing devices capable of performing all calculations that do not need to be performed in real time and all control functions. These microcontrollers 228 and 236 are conventional, and any microcontroller capable of storing data and instructions and executing instructions as will be described in further detail below may be used. The frequency at which the microcontrollers 228,236 operate is determined by crystals 228a and 236a that operate at 4 MHz in the exemplary system 20.

The baseband processors 232 and 240 are conventional and are specifically designed to work with the spread spectrum radio circuits 120 and 128. Harris manufactures a product sold under the part number HSP 3824 that is particularly suited for use as the processors 232 and 240.

The ASICs 230 and 238 are identical, but only some of the functions programmed therein are used in both the handheld data processing circuit 122 and the transponder data processing circuit 130. Certain functions are used solely in one or another of these circuits 122 and 130 as will be described in detail below. Generally speaking, the ASICs 230 and 238 implement functions that must be performed in real time, and especially those functions that must be performed at relatively high speeds. The ASICs 230 and 238 further contain certain glue logic and buffering circuits that offload some computational demands from the microcontrollers 220 and 228, which operate at a relatively low clock rate. These computational demands are due, in part, to the fact that the baseband processors are operating at a relatively high clock rate.

The oscillators 234,242 generate a clock signal referred to as MCLK. The baseband processor operates on the MCLK signal. For the system 20 to operate correctly, the MCLK signal generated by the oscillator 234 must be slightly different from the MLCK signal generated by the oscillator 242. In the exemplary system 20, the MCLK signals are generated by the oscillators 234 and 242 have nominal frequencies of 20.0000 MHz (handheld unit) and 19.9995 MHz (transponder unit), respectively.

The difference in frequency between these MCLK signals creates the need for the baseband processors 232, 240 periodically to resynchronize to incoming data and periodically generate skip signals as discussed above. The periods between these skip signals can thus be used to calculate the frequency difference between the MCLK signals and thus reduce uncertainties as to when a given RF signal was received. With the exemplary MCLK frequencies described above, the frequency difference is approximately 500 Hz. Accordingly, a skip signal should occur approximately once every 1 ms (1 kHz).

Referring for a moment back to FIG. 5, the LCD 222 displays distance values to the user. Any output device capable of communicating the distance value to the user may be used in place of the LCD 222. The control buttons 224 comprise a hole-up button, a hole-down button, and a measurement button. The hole-up and hole-down buttons are pressed to identify the hole to which the user wants to find the distance. Pressing the measurement button starts the measurement process. Simultaneously pressing the hole-down and measurement buttons starts the calibration process. Simultaneously pressing the hole-up and measurement buttons toggles between displaying distance values in yards or in meters.

Referring again to FIG. 6, each of the dip switches 226 is set to represent digital codes associated with the hole at which the transponder unit 24 is located. As described above, each transponder unit 24 is located at a particular hole on the golf course 44. The digital codes programmed into the dip switches 226 allows the transponder units 24 to recognize and respond only to RF Receive Data signals containing a matching code. The transponder units 24 thus do not process or send RF Send Data signals in response to requests for distances to transponder units 24 located at different holes.

Referring for a moment to both FIG. 5 and FIG. 6, the interconnections of the various components of the data processing circuits 122,130 will now be briefly discussed.

The microcontrollers 228,236 are in communication with the power supplies 124,130 via signal paths 244,246. The power supplies 124,130 supply power to the spread spectrum radio circuits 120,128 via cables 248,250. The microcontrollers 228,236 are also in direct communication with the radio circuits 120,128 via data paths 252,254. These signal paths 244,246, and 252,254 and cables 248,250 allow the microcontrollers 228,236 to control power flow to and thus power consumption by the radio circuits 120,128.

The microcontrollers 228,236 directly communicate with the baseband processors 232,240 through first and second control lines 256,258 and 260,262. The first control lines 256,258 carry control signals such as TX_PE and RX_CLK from the microcontrollers 228,236 to the baseband processors 232,240. The TX_PE signal enables the baseband processors 232,240 for transmission. The RX_CLK signal clocks received data out of the baseband processor 232,240.

The second control lines 256,258 carry signals such as TX_RDY and MD_RDY from the baseband processors 232,240 to the microcontrollers 228,236. The rising edge of the TX_RDY signal indicates that data transmission has begun. The MD_RDY signal is high while the baseband processor is receiving data, and the rising edge of the MD_RDY signal indicates when the system began receiving data.

The microcontrollers 228,236 are further in communication with the baseband processors 232,240 through the ASICs 230,238, data buses 264,266, transmit data lines 268,270, and receive data lines 272,274. As will be described in detail below, the ASICs 230,238 act as data buffers between the relatively high frequency baseband processors 232,240 and the relatively low frequency microcontrollers 228,236. In particular, the transmit data lines 268,270 carry a serial transmit data signal TXD, and the receive data lines 272,274 carry a serial receive data signal RXD. The ASICS 230,238 convert parallel data carried over the microcontroller data buses 264,266 to the serial signal TXD and converts the serial RXD signal into binary words that are appropriate for transmission over the parallel data buses 264,266.

Read/write timing and clear signals are conveyed from the microcontrollers 228,236 to the ASICs 230,238 via control lines 276,278, while response signals are passed back from the ASICs 230,238 to the microcontrollers 228,236 via control lines 280,282.

The MCLK signals are passed to the spread spectrum radio circuits 120,128 over signal lines 284,286 for use as reference signals.

Referring now to FIGS. 7–11, the details of construction of the ASICs 230,238 will be described. The circuits described with reference to FIGS. 7–11 generally perform independently of each other but may be packaged in a single ASIC (or FPGA) as described herein for ease of manufacturing and cost reduction.

Figure 7:
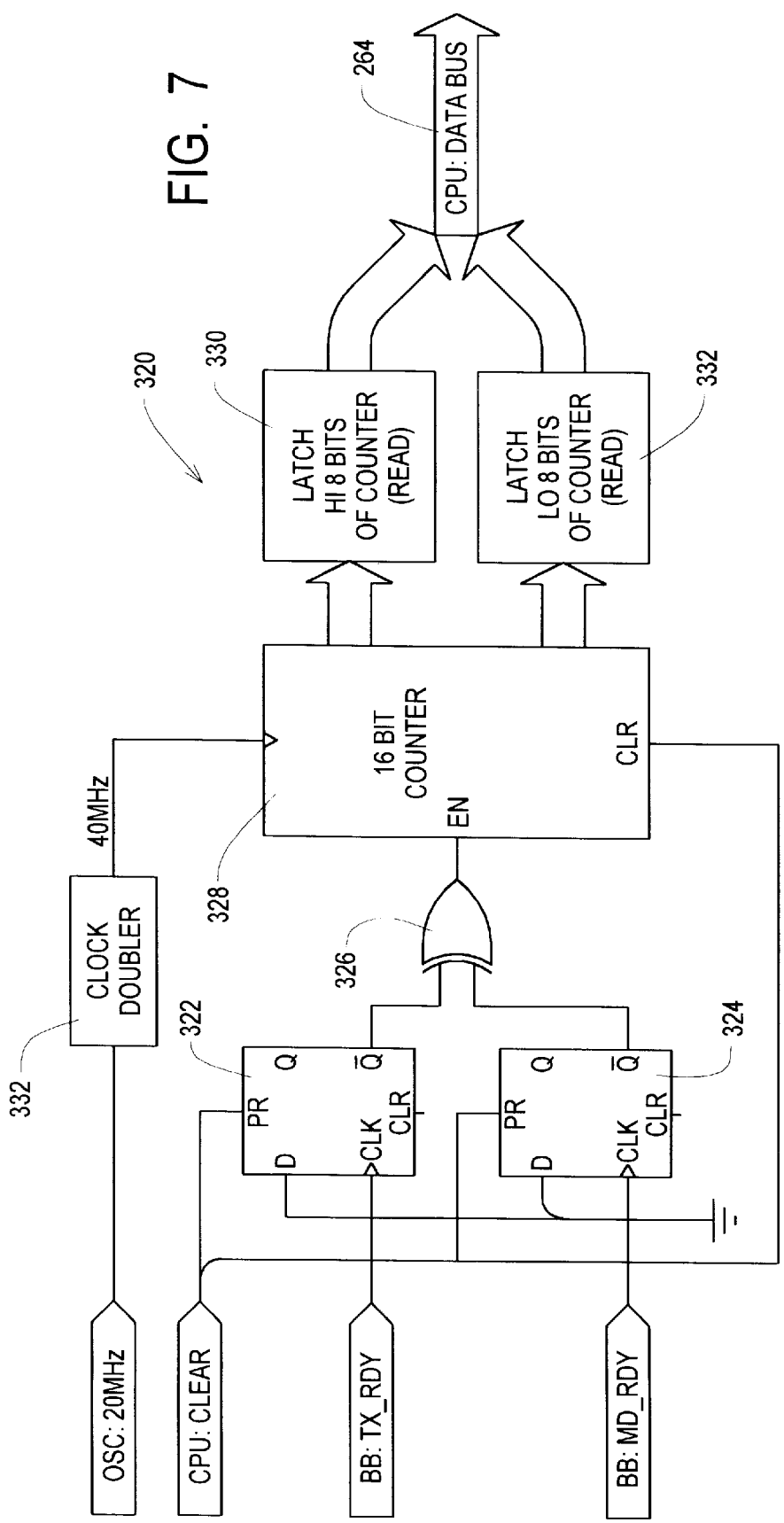
FIGS. 7–11 are detailed circuit diagrams depicting the logic implemented by the ASIC forming a part of the handheld unit and transponder unit data processing circuits.

FIG. 7 discloses a coarse timing circuit 320 that generates a coarse timing value based on the TX_RDY and MD_RDY signals generated by the baseband processor 232 of the data processing circuit 122 of the handheld unit 22. As discussed briefly above, the baseband processor 232 generates TX_RDY and MD_RDY signals at points in time that correspond to the transmission and receipt of RF signals by the handheld unit 22. The coarse timing circuit 320 is used only in the ASIC 230 of the data processing circuit 122 because only the handheld unit 22 is capable of performing the coarse timing measurement.

More specifically, the coarse timing circuit 320 comprises first and second flip flops 322 and 324, an exclusive OR gate 326, a 16-bit counter 328, Hi and Lo latches 330 and 332, and a clock doubler circuit 334.

The microcontroller 228 generates a CLEAR signal that resets the flip flops 322 and 324 and clears the counter 328. The MCLK signal is doubled by the clock doubler 334. The clock doubler circuit 334 is connected to a CLK input of the counter 328 such that, when enabled, the counter 328 counts the pulses of the doubled MCLK signal.

The TX_RDY and MD_RDY signals are applied to the CLK inputs of the flip flops such that the leading edges of these signals generate a high output at the Q-not outputs of the flip flops 322 and 324. The Q-not outputs of the flip flops 322 and 324 are applied to the exclusive-OR gate 326. The CLEAR signal controls the flip flops and counter such that the counter 328 is enabled by the leading edge of the TX_RDY signal and disabled by the leading edge of the MD_RDY signal.

The value reached by the counter 328 is a 16-bit representation of the coarse timing value and is applied to the latches 330 and 332. These latches 330 and 332 pass the Hi and Lo eight bits of the coarse timing value over the data bus 264 to the microcontroller 228 for further processing.

Figure 8:
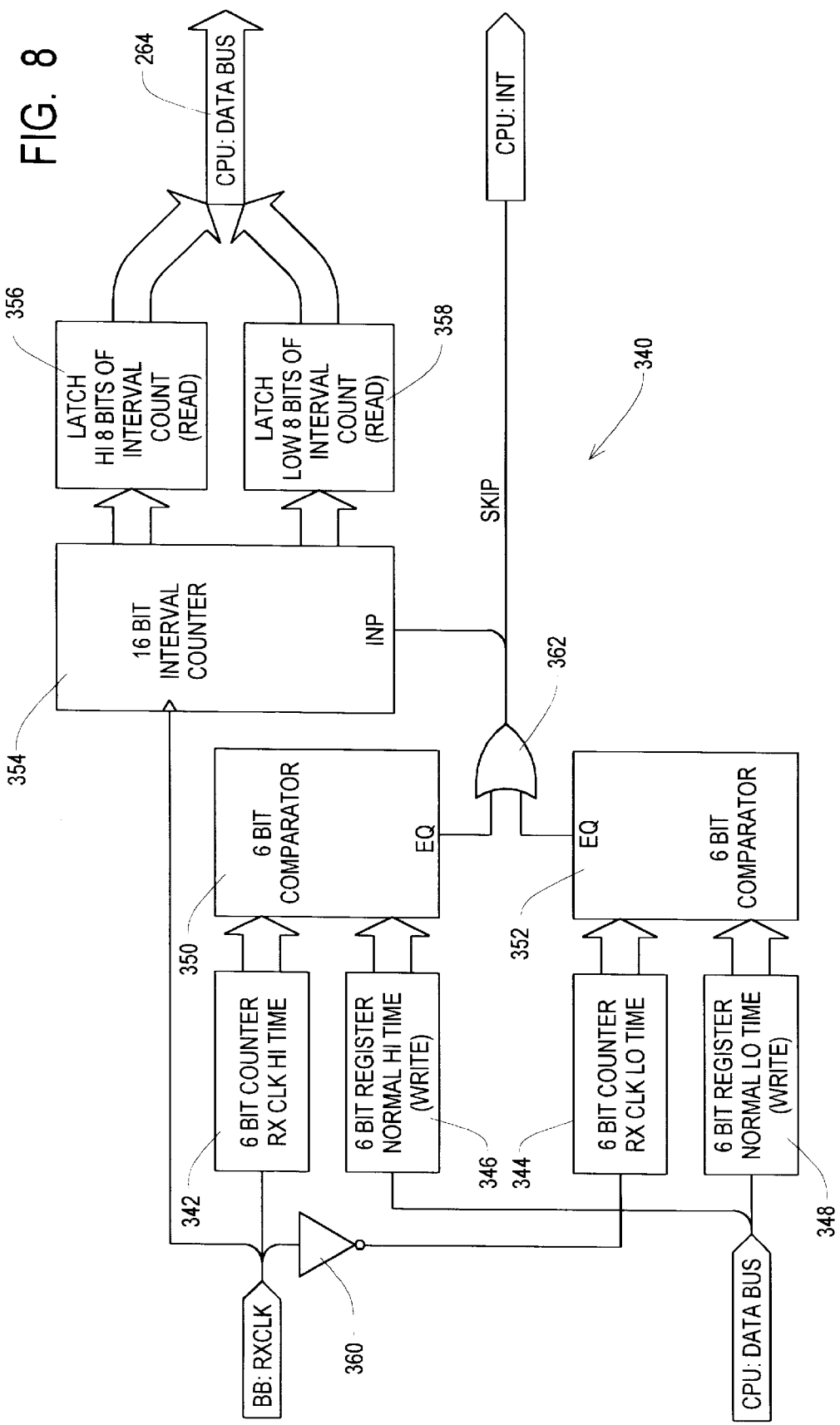

Referring now to FIG. 8, depicted therein is a programmable counter circuit 340 used to calculate the fine timing value. The circuit 340 comprises Hi and Lo 6-bit counters 342 and 344, Hi and Lo 6-bit registers 346 and 348, Hi and Lo comparators 350 and 352, a 16-bit counter 354, Hi and Lo latches 356 and 358, an inverter 360, and an OR gate 362.

The fine timing circuit 340 operates basically as follows. The registers 346 and 348 are loaded with a binary number corresponding to the number of MSCLK signals that nominally occur during the high and low portions of the RXCLK, respectively. When the actual High time or Low time of the RXCLK does NOT match the nominal value, a skip has occurred. As described above, the receive clock signal RXCLK is an output of the baseband processors 232,240 that is present when data is being received. This signal RXCLK enables the counters 342 and 344 so that the counters count only when data is being received.

The MSCLK signal is applied to the clock inputs of the counters 342 and 344 (one counter counts the high time, and then the other begins counting the low time) such that the outputs of these counters represent the actual number of pulses of the MSCLK signal that occur during the High and Low portions of the RXCLK. The comparators 350 and 352 compare the outputs of the counters 342,344 and registers 346,348, and a SKIP signal is generated by ORed not-equal outputs of the comparators.

The RXCLK signal is input to the clock input of the counter 354 and the SKIP signal is input to the latch/reset input INP of the counter 354. The output of the counter 354 is thus a binary number indicative of the number of RXCLK signals that occur between skips. This number can be used to determine the time between skips. The time between skips in turn is used to calculate the frequency difference between the MSCLK signals at the handheld unit 22 and transponder unit 24. As described above, this frequency difference can be used to pinpoint the time during the MSCLK signal cycle that a given data signal has been received.

The SKIP signal is also passed to the microcontroller 228 and is used to signal when to read data from Latches 356,358 over the data bus 264.

Figure 9:
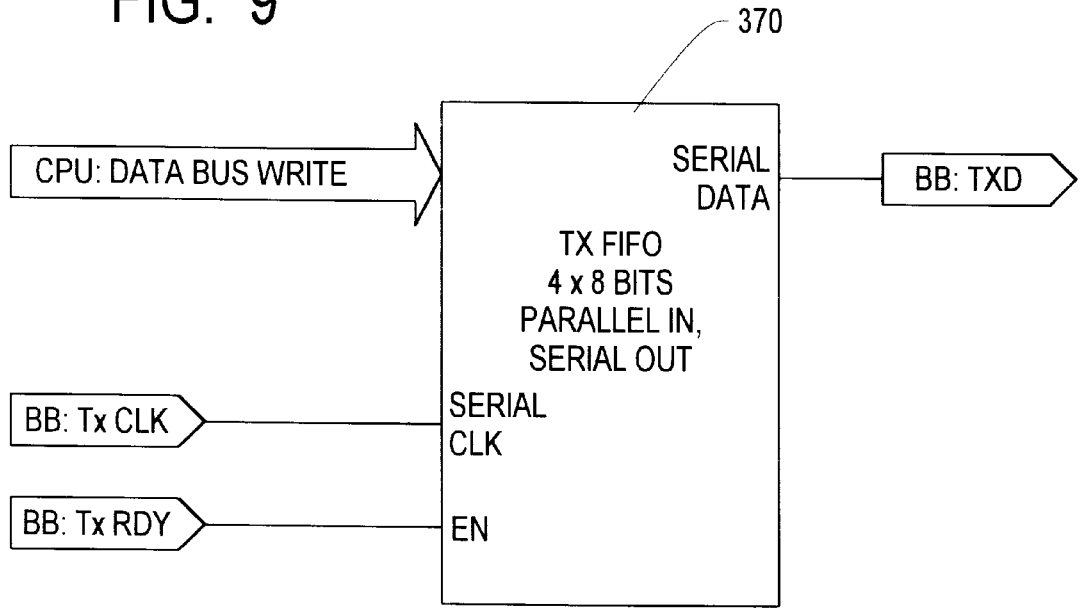
Figure 10:
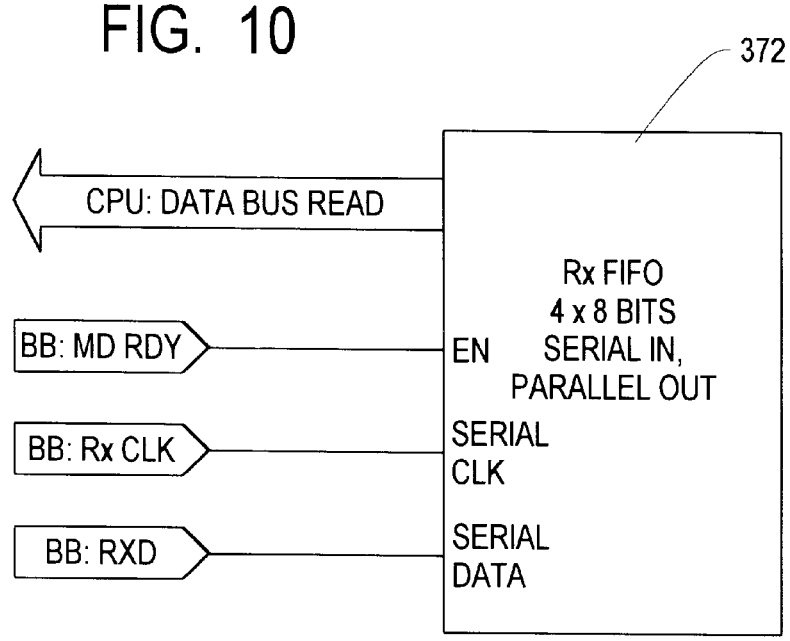

Referring now to FIGS. 9 and 10, these drawings depict FIFO circuits 370 and 372 that are used to transfer data between the microcontrollers 228,236 and the baseband processors 232,240. These circuits 370 and 372 convert parallel to serial and serial to parallel, respectively, and also allow the relatively slow clock speed microcontrollers 228, 236 to transfer data with the baseband processors 232,240.

Figure 11:
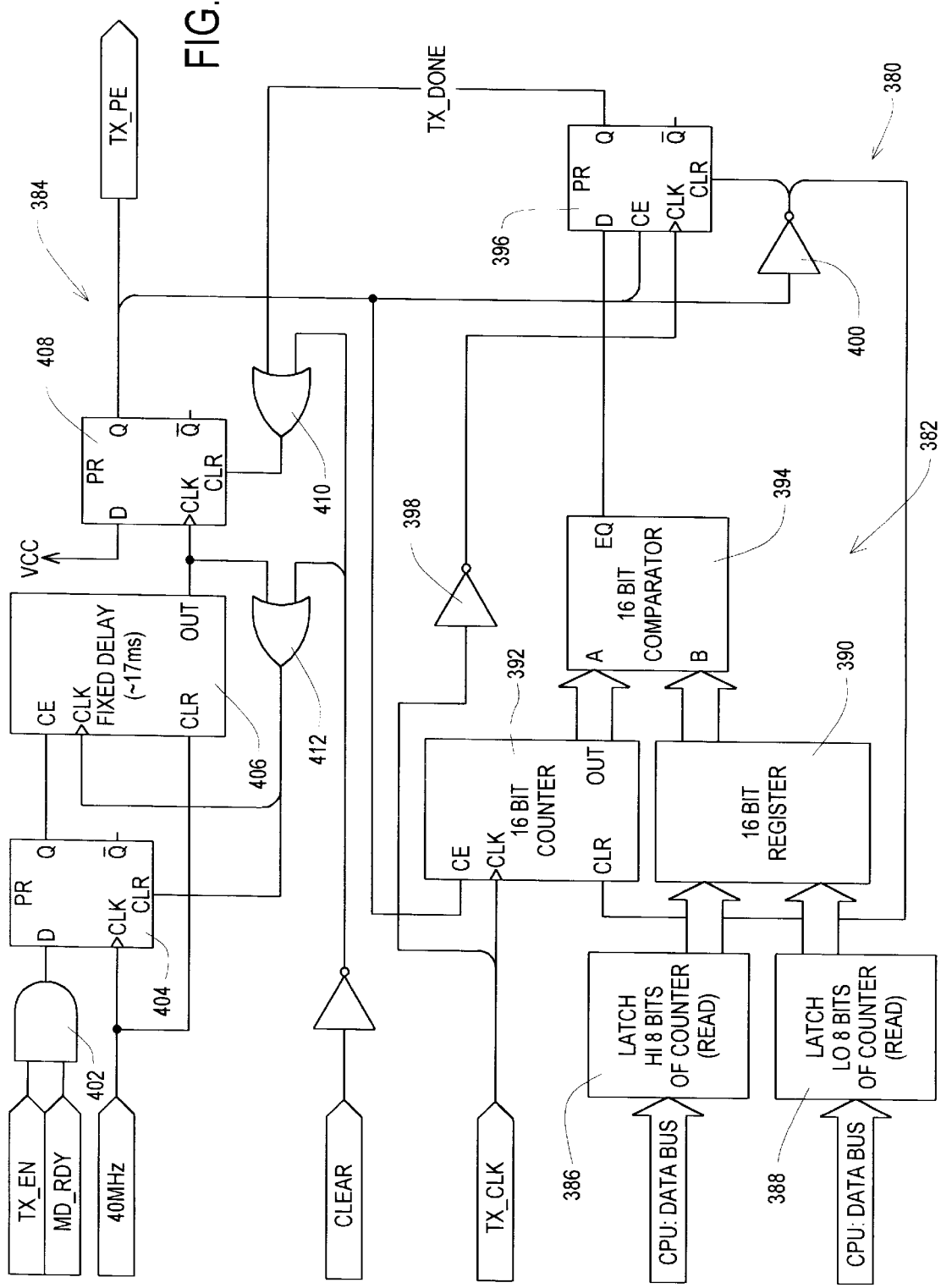

Referring now to FIG. 11, depicted therein is a timing/delay circuit 380 that is used only in the ASIC 238 in the transponder unit 24. The circuit 380 comprises a programmable counter 382 and a delay circuit 384.

The programmable counter 382 comprises latches 386 and 388, a register 390, a counter 392, a comparator 394, a latch 396, and inverters 398 and 400. A binary number representative of the number of bytes of data to be transmitted is loaded into the latches 386 and 388 and stored in the register 390. The signal TX_CLK is applied to the clock input of the counter 392. The value in the register 390 is compared with the value reached by the counter 392 and, when these values are equal, the comparator 394 causes the latch 396 to generate a TX_DONE signal that indicates that transmission is complete.

The delay circuit 384 comprises an AND gate 402, a delay latch 404, a delay device 406, an output latch 408, and OR gates 410 and 412. The TX_EN and MD_RDY signals are ANDed by the AND gate 402 and thus must both be high for data to be passed through the delay device 406. The doubled 40 MHz clock signal is applied to the clock input of the flip flop 404, which causes a high signal to be passed to the Q output of the flip flop 404 and thus to the clear enable input of the delay device 406. The 40 MHz signal is also applied to the clock input of the delay device 406. Accordingly, the delay device 406 goes high a predetermined delay period after both the TX_EN and MD_RDY signals go high. The output of the delay device is latched by the flip flop 408 to create a TX_PE signal that is sent to the baseband processor 240 to enable data transmission.

The TX_DONE signal generated by the counter circuit 382 clears the flip flop 408 and thus forces TX_PE low, thereby disabling data transmission.

A CLEAR signal from the microcontroller 236 is passed through an inverter 414 and the OR gates 410 and 412 and inverter 400 to allow the circuits 382 and 384 to be cleared.

Referring now to FIGS. 12 to 17, depicted therein are flow charts 420 and 422 that graphically depict the processing performed by the microcontrollers 228 and 236, respectively. These flow charts describe how the microcontrollers 228 and 236 control and sequence the various components and processes described above.

As shown at 424 in FIG. 12, the microcontroller 228 in the handheld unit 22 calculates a distance measurement based on the coarse measurement and a fine measurement calculated based on the skips. FIG. 12 also shows a number of steps that are implemented to validate and refine the distance measurements. FIG. 12 shows that the system starts out in low power mode and changes to high power mode if a valid signal is not received. If no valid signal is received and the system is already in high power mode, the measurement process has failed.

FIGS. 13, 14, and 15 more specifically depict the algorithms employed in the measurement process implemented by the flow chart of FIG. 12. FIG. 13 depicts the calculation of distance based on the coarse measurement value, the fine measurement values, and various constants and system parameters that affect round trip propagation of the signal. FIG. 14 depicts the calculation of the fine measurement value based on the SKIP signals described above, including a step 426 in which the first skip is estimated. FIG. 15 depicts the details of the estimation of the first skip generally depicted at step 426 of the flow chart of FIG. 14.

The measurement process is repeated until a number of valid measurement values are obtained. These validated measurement values are then averaged and displayed in meters or yards as appropriate.

Another step performed on each measurement process is a validation process in which measurement values are compared with values before and after. As shown in FIG. 16, this validation process is referred to as a "bucket" averaging algorithm in which measurement values that are within a predetermined distance from one another are placed in a first category or "bucket". Measurement values that differ from the others by more than the predetermined distance are placed in a second bucket. Measurement values that are not within the predetermined distance of the measurement values in the first and second buckets are discarded.

If one of the buckets becomes "filled" with a predetermined number of measurement values within a predetermined number of measurements, the values within that bucket are considered validated and averaged to obtain the final measurement value. If neither of the buckets is filled within the predetermined number of measurements, the measurement values are considered invalid and failed measurements.

FIGS. 17A and 17B illustrate that the transponder unit 24 is normally "asleep" and periodically "wakes" to listen for appropriate spread spectrum radio signals. When an appropriate signal is detected, a fine measurement value is generated and the data carried by the signal is examined to determine whether this data is intended for the particular transponder unit 24. If the data was intended for that transponder unit 24, the data is examined to determine whether it was sent by a handheld unit in high power mode or low power mode. The transmitter of the transponder unit is then set to high power mode and the data is transmitted back to the handheld unit after a 13 ms delay.

The microcontrollers determine what data is carried between the handheld unit and transponder unit. The exact content and format of these data packets is not critical as long as certain information is transferred as necessary to perform the functions described above. For example, the data packets from the handheld unit to the transponder unit carry at least desired hole and high/low power information. The data packets from the transponder unit to the handheld unit also contain desired hole information but would contain skip position data measured at the transponder unit and would not need to carry high/low power information. All data packets will also contain a header automatically generated by the baseband processor that would allow the data within the packet to be identified, extracted, and used as necessary for the processing described above. This is a requirement of the specific baseband processor used, and may vary from manufacturer to manufacturer.

From the foregoing, it should be clear that the present invention could be used in other environments without departing from the teachings of the present invention.

For example, a first distancing unit corresponding to the handheld unit could be carried by a parent and a plurality of second distancing units corresponding to the transponder units could be carried by children and/or attached to important objects such as cameras and the like. When one (or more) of the children or objects is greater than a predetermined distance from the parent, the first distancing unit would signal this fact to the parent (by an audible alarm or vibration unit) and identify the child or object that is too faraway.

In an industrial setting, distancing units could be placed on movable objects such as cranes and the like to ensure that these cranes do not come too close to other cranes or walls.

The scope of the present invention should thus be determined based on the claims appended hereto rather than on the foregoing detailed description.

What is claimed is:

1. A system for determining the distance between a first location and a second location, the system comprising:

a first distancing unit located adjacent to the first location, the first distancing unit comprising a first radio frequency transceiver for transmitting a first send data stream as a first send radio frequency signal and generating a first receive data stream from a first receive radio frequency signal, and a first baseband processor circuit that operates based on a first clock signal having a first clock frequency, where the first receive data stream is asynchronous relative to the first clock signal and the first baseband processor circuit comprises means for generating a first data receive signal indicating when the first receive radio frequency signal is received by the first radio frequency transceiver based on the first receive data stream and the first clock signal, means for adjusting the first receive data stream in time when the first receive data stream becomes out of synchrony with the first clock signal by a predetermined amount, means for generating a first skip signal whenever the first receive data stream is adjusted in time;

a second distancing unit located adjacent to the second location, the second distancing unit comprising a second radio frequency transceiver for transmitting a second send data stream as a second send radio frequency signal and generating a second receive data stream from a second receive radio frequency signal, and a second baseband processor circuit that operates based on a second clock signal having a second clock frequency, where the second receive data stream is asynchronous relative to the second clock signal and the second baseband processor circuit comprises means for generating a second data receive signal indicating when the second receive radio frequency signal is received by the second radio frequency transceiver based on the second receive data stream and the second clock signal, means for adjusting the second receive data stream in time when the second receive data stream becomes out of synchrony with the second clock signal by a predetermined amount, means for generating a second skip signal whenever the second receive data stream is adjusted in time;

first control means for operating the first distancing unit to transmit the first send radio frequency signal to the second distancing unit;

second control means for operating the second distancing unit in response to the first send radio frequency signal to transmit the second send radio frequency signal to the first distancing unit;

coarse timing means for generating a course timing value based on the first data transmit signal and the first data receive signal;

first fine timing means for generating a first fine timing value based on a plurality of first skip signals; and distance calculating means for calculating a distance value based on the coarse timing value and the first fine timing value.

2. A system as recited in claim 1, further comprising second fine timing means for generating a second fine timing value based on a plurality of second skip signals, in which the distance calculating means further calculates the distance value based on the second fine timing value.

3. A system as recited in claim 2, in which:

the first fine timing means and the distance calculating means are located at the first location;

the second fine timing means is located at the second location; and the second fine timing value is carried from the second location to the first location by the second send radio frequency signal.

4. A system as recited in claim 2, in which the distance calculating means calculates a plurality of distance values based on a plurality of coarse timing values, a plurality of first fine timing values, and a plurality of second fine timing values, the system further comprising verification means for comparing at least one of the distance values with at least another of the distance values to verify the validity of the plurality of distance values.

5. A system as recited in claim 2, in which the distance calculating means calculates a plurality of distance values based on a plurality of coarse timing values, a plurality of first fine timing values, and a plurality of second fine timing values, the system further comprising averaging means for generating an averaged distance value based on the plurality of distance values.

6. A system as recited in claim 4, further comprising averaging means for generating an averaged distance value based on the plurality of verified distance values.

7. A system as recited in claim 1, further comprising first frequency difference determining means for generating a first frequency difference value corresponding to a frequency difference between the first and second clock signals based on the skip signals generated by the baseband processor at the first distancing unit, where the first fine timing means generates the first fine timing value based on the first frequency difference value.

8. A system as recited in claim 2, further comprising first and second frequency difference determining means for generating first and second frequency difference values corresponding to a frequency difference between the first and second clock signals based on the skip signals generated by the baseband processors, where the first fine timing means generates the first fine timing value based on the first frequency difference value and the second fine timing means generates the second fine timing value based on the second frequency difference value.

9. A system as recited in claim 1, in which the distance value is calculated with the first distancing unit a known distance from the second distancing unit to generate a calibration value, where the distance calculating means generates subsequent distance values further based on the calibration value.

10. A system as recited in claim 7, in which more than two distancing units are provided, where the first distancing unit is a mobile distancing units that is not located at a fixed location and the second distancing unit is one of a plurality of fixed distancing units that are located at fixed locations, wherein:

each mobile distancing unit comprises selecting means for allowing a user to generate selection data corresponding to one of the fixed distancing units, and data generating means for placing the selection data into the first send data stream carried by the first send radio frequency signal; and each fixed distancing unit comprises repeater means for controlling the second control means, where the repeater means allows the second distancing unit to operate only when the second receive radio frequency signal generated in response to the first send radio frequency signal contains selection data corresponding to the second distancing unit.

11. A system for determining the distance between a first location and a second location, the system comprising:

first and second distancing units located adjacent to the first and second locations, respectively, where the first and second distancing units each comprise a radio frequency transceiver for transmitting send data streams as send radio frequency signals and generating receive data streams from receive radio frequency signals, and a baseband processor circuit that operates based on a local clock signal having a local clock frequency, where the receive data streams are asynchronous relative to the local clock signal and the baseband processor circuit comprises means for generating a data receive signal indicating when the receive radio frequency signals are received by the radio frequency transceiver based on the receive data streams and the local clock signal, means for adjusting the receive data streams in time when the receive data streams become out of synchrony with the local clock signal by a predetermined amount, means for generating a skip signal whenever the receive data streams are adjusted in time;

first control means for operating the first distancing unit to generate a first send radio frequency signal, where the first send radio frequency signal forms a first receive radio frequency signal at the second distancing unit;

second control means for operating the second distancing unit in response to the first receive radio frequency signal to transmit a second send radio frequency signal, where the second send radio frequency signal forms a second receive radio frequency signal at the first distancing unit;

coarse timing means for generating a course timing value based on the local clock signal of the first distancing unit, a data transmit signal generated at the first distancing unit when the first distancing unit transmits the first send radio frequency signal, and a data receive signal generated at the first distancing unit in response to the second receive radio frequency signal;

first fine timing means for generating a first fine timing value based on a plurality of skip signals generated at the second distancing unit;

second fine timing means for generating a second fine timing value based on a plurality of skip signals generated at the first distancing unit; and distance calculating means for calculating a distance value based on the coarse timing value, the first fine timing value, and the second fine timing value.

12. A system as recited in claim 11, in which: the first fine timing means and the distance calculating means are located at the first location;

the second fine timing means is located at the second location; and the second fine timing value is carried from the second location to the first location by the second send radio frequency signal.

13. A system as recited in claim 11, in which the distance calculating means calculates a plurality of distance values based on a plurality of coarse timing values, a plurality of first fine timing values, and a plurality of second fine timing values, the system further comprising verification means for comparing at least one of the distance values with at least another of the distance values to verify the validity of the plurality of distance values.

14. A system as recited in claim 11, in which the distance calculating means calculates a plurality of distance values based on a plurality of coarse timing values, a plurality of first fine timing values, and a plurality of second fine timing values, the system further comprising averaging means for generating an averaged distance value based on the plurality of distance values.

15. A system as recited in claim 13, further comprising averaging means for generating an averaged distance value based on the plurality of verified distance values.

16. A system as recited in claim 11, further comprising first and second frequency difference determining means for generating first and second frequency difference values corresponding to a frequency difference between the first and second clock signals based on the skip signals generated by the baseband processors, where the first fine timing means generates the first fine timing value based on the first frequency difference value and the second fine timing means generates the second fine timing value based on the second frequency difference value.

17. A system as recited in claim 11, in which the distance value is calculated with the first distancing unit a known distance from the second distancing unit to generate a calibration value, where the distance calculating means generates subsequent distance values further based on the calibration value.

18. A system as recited in claim 11, in which more than two distancing units are provided, where the first distancing unit is a mobile distancing units that is not located at a fixed location and the second distancing unit is one of a plurality of a fixed distancing units that are located at fixed locations, wherein:

each mobile distancing unit comprises selecting means for allowing a user to generate selection data corresponding to one of the fixed distancing units, and data generating means for placing the selection data into the first send data stream carried by the first send radio frequency signal; and each fixed distancing unit comprises repeater means for controlling the second control means, where the repeater means allows the second distancing unit to operate only when the second receive radio frequency signal generated in response to the first send radio frequency signal contains selection data corresponding to the second distancing unit.

19. A system for determining the distance between a first location and a second location, the system comprising:

first and second distancing units located adjacent to the first and second locations, respectively, where the first and second distancing units each comprise a radio frequency transceiver for transmitting send data streams as send radio frequency signals and generating receive data streams from receive radio frequency signals, a baseband processor circuit that operates based on a local clock signal having a local clock frequency, where the receive data streams are asynchronous relative to the local clock signal and the baseband processor circuit comprises means for generating a data receive signal indicating when the receive radio frequency signals are received by the radio frequency transceiver based on the receive data streams and the local clock signal, and computing means for generating a frequency difference value indicative of a frequency difference between the local clock frequencies of the baseband processor circuits of the first and second distancing units;

first control means for operating the first distancing unit to generate a first send radio frequency signal, where the first send radio frequency signal forms a first receive radio frequency signal at the second distancing unit;

second control means for operating the second distancing unit in response to the first receive radio frequency signal to transmit a second send radio frequency signal, where the second send radio frequency signal forms a second receive radio frequency signal at the first distancing unit;

coarse timing means for generating a course timing value based on the local clock signal of the first distancing unit, a data transmit signal generated at the first distancing unit when the first distancing unit transmits the first send radio frequency signal, and a data receive signal generated at the first distancing unit in response to the second receive radio frequency signal;

first fine timing means for generating a first fine timing value based on the frequency difference value generated by the computing means of the first distancing unit; and distance calculating means for calculating a distance value based on the coarse timing value and the first fine timing value.

20. A system as recited in claim 19, further comprising second fine timing means for generating a second fine timing value based on the frequency difference value generated by the computing means of the second distancing unit, where the distance calculating means further calculates the distance value based on the second fine timing value.

21. A system as recited in claim 19, in which:

the baseband process circuit further comprises
means for adjusting the receive data streams in time when the receive data streams become out of synchrony with the local clock signal by a predetermined amount, and
means for generating a skip signal whenever the receive data streams are adjusted in time; wherein
the first fine timing means generates the first fine timing value based on a plurality of skip signals generated at the first distancing unit; and
the second fine timing means generates a second fine timing value based on a plurality of skip signals generated at the second distancing unit.

22. A method of determining the distance between first and second locations comprising the steps of:

locating first and second distancing units adjacent to the first and second locations, respectively, where the first and second distancing units each comprise a radio frequency transceiver for transmitting send data streams as send radio frequency signals and generating receive data streams from receive radio frequency signals, and a baseband processor circuit that operates based on a local clock signal having a local clock frequency, where the receive data streams are asynchronous relative to the local clock signal and the baseband processor circuit comprises means for generating a data receive signal indicating when the receive radio frequency signals are received by the radio frequency transceiver based on the receive data streams and the local clock signal, means for adjusting the receive data streams in time when the receive data streams become out of synchrony with the local clock signal by a predetermined amount, means for generating a skip signal whenever the receive data streams are adjusted in time;

operating the first distancing unit to generate a first send radio frequency signal, where the first send radio frequency signal forms a first receive radio frequency signal at the second distancing unit;

operating the second distancing unit in response to the first receive radio frequency signal to transmit a second send radio frequency signal, where the second send radio frequency signal forms a second receive radio frequency signal at the first distancing unit;

generating a course timing value based on the local clock signal of the first distancing unit, a data transmit signal generated at the first distancing unit when the first distancing unit transmits the first send radio frequency signal, and a data receive signal generated at the first distancing unit in response to the second receive radio frequency signal;

generating a first fine timing value based on a plurality of skip signals generated at the second distancing unit;

generating a second fine timing value based on a plurality of skip signals generated at the first distancing unit; and calculating a distance value based on the coarse timing value, the first fine timing value, and the second fine timing value.

* * * * *